US011984693B2

(12) United States Patent
Schütt et al.

(10) Patent No.: US 11,984,693 B2
(45) Date of Patent: May 14, 2024

(54) METHOD FOR PRODUCING AT LEAST ONE HIGH-FREQUENCY CONTACT ELEMENT OR A HIGH-FREQUENCY CONTACT ELEMENT ARRANGEMENT

(71) Applicant: Rosenberger Hochfrequenztechnik GmbH & Co. KG, Fridolfing (DE)

(72) Inventors: Hauke Schütt, Bünsdorf (DE); Waldemar Schmidt, Burgkirchen an der Alz (DE); Alexandra Henniger-Ludwig, Munich (DE)

(73) Assignee: ROSENBERGER HOCHFREQUENZTECHNIK GMBH & CO. KG, Fridofing (DE)

( * ) Notice: Subject to any disclaimer, the term of this patent is extended or adjusted under 35 U.S.C. 154(b) by 892 days.

(21) Appl. No.: 16/975,854

(22) PCT Filed: Feb. 4, 2019

(86) PCT No.: PCT/EP2019/052562

§ 371 (c)(1),
(2) Date: Aug. 26, 2020

(87) PCT Pub. No.: WO2019/162066

PCT Pub. Date: Aug. 29, 2019

(65) Prior Publication Data

US 2020/0403364 A1 Dec. 24, 2020

(30) Foreign Application Priority Data

Feb. 26, 2018 (DE) ......................... 102018104264.7

(51) Int. Cl.
*H01R 43/00* (2006.01)
*H01R 13/24* (2006.01)
(Continued)

(52) U.S. Cl.
CPC ....... *H01R 43/007* (2013.01); *H01R 13/2414* (2013.01); *H01R 43/16* (2013.01);
(Continued)

(58) Field of Classification Search
CPC .. H01R 12/52; H01R 13/2407; H01R 43/007; H01R 13/2464; H01R 12/7076;
(Continued)

(56) References Cited

U.S. PATENT DOCUMENTS 5,158,465 A 10/1992 Zaderej et al.
5,495,395 A 2/1996 Yoneda et al.
(Continued)

FOREIGN PATENT DOCUMENTS

CN 1373853 A 10/2002
CN 107148247 A 9/2017
(Continued)

*Primary Examiner* — Thiem D Phan
(74) *Attorney, Agent, or Firm* — David P. Dickerson

(57) ABSTRACT

A method, comprising: forming a dielectric structure, the structure comprising a first terminal surface, a second terminal surface and a through-hole that extends from the first terminal surface to the second terminal surface, applying an electrically conductive material to at least a portion of the dielectric structure, removing a first portion of the electrically conductive material from the first terminal surface, and removing a second portion of the electrically conductive material from the second terminal surface, a remaining portion of the electrically conductive material constituting at least an inner conductor of a first generally coaxial conductor pair and a first shielding conductor of the first generally coaxial conductor pair, and the inner conductor extending through the through-hole.

20 Claims, 11 Drawing Sheets

Figure 1A:
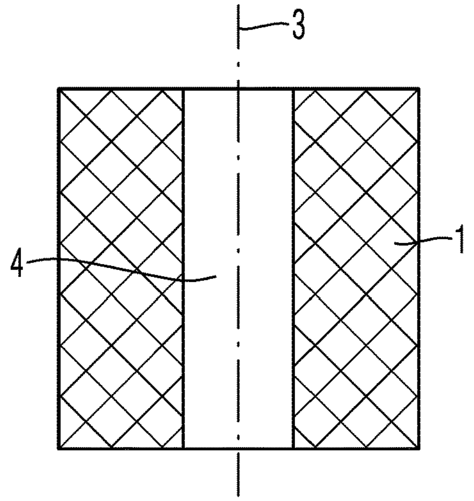

(51) Int. Cl.

| | |
|---|---|
| ***H01R 43/16*** | (2006.01) |
| *H01R 12/71* | (2011.01) |
| *H01R 13/03* | (2006.01) |
| *H01R 24/50* | (2011.01) |

(52) U.S. Cl.
CPC .......... *H01R 12/714* (2013.01); *H01R 13/035* (2013.01); *H01R 24/50* (2013.01); *H01R 2201/20* (2013.01); *Y10T 29/49204* (2015.01)

(58) Field of Classification Search
CPC .............. H01R 43/205; H01R 13/2414; H01R 13/2492; H01R 12/79; H01R 13/02; H01R 43/18; H05K 2201/10378; H05K 2201/0382; Y10T 29/49204
USPC .................................. 29/874, 825, 884, 885
See application file for complete search history.

(56) References Cited

U.S. PATENT DOCUMENTS

| | | | | |
|---|---|---|---|---|
| 7,042,236 | B1 | 5/2006 | Wollitzer | |
| 8,137,113 | B2 * | 3/2012 | Ouchi | H05K 3/326 439/66 |
| 2009/0197437 | A1 | 8/2009 | Ouchi | |
| 2012/0164888 | A1 | 6/2012 | Rathburn | |
| 2013/0078860 | A1 | 3/2013 | Rathburn | |
| 2016/0214327 | A1 | 7/2016 | Uckelmann et al. | |

FOREIGN PATENT DOCUMENTS

| | | | |
|---|---|---|---|
| DE | 102016004520 | A1 | 10/2017 |
| JP | H0590729 | A | 4/1993 |
| WO | 2016059222 | A1 | 4/2016 |

* cited by examiner

METHOD FOR PRODUCING AT LEAST ONE HIGH-FREQUENCY CONTACT ELEMENT OR A HIGH-FREQUENCY CONTACT ELEMENT ARRANGEMENT

FIELD OF THE INVENTION

The present invention relates to a method for producing at least one high-frequency contact element or a high-frequency contact element arrangement and associated apparatuses.

TECHNICAL BACKGROUND

Modern connection technology comprises not only contact elements for contact-making and transmission of DC voltage signals or low-frequency signals in accordance with DE 10 2016 004 520 A1, but also contact elements for contact-making and transmission of high-frequency signals. Here and in the text which follows, a high-frequency signal is understood to mean a signal having a frequency of above 3 MHz to 30 THz, i.e. virtually the entire range of the electromagnetic spectrum.

Contact elements are preferably used for transmitting high-frequency signals between contact terminals of two adjacent printed circuit boards (so-called board-to-board connection).

A further large application area of contact elements for high-frequency signals is the contact-making and transmission of a high-frequency signal between a contact terminal of a circuit to be tested, for example an integrated circuit to be tested, and a contact terminal of a printed circuit board, which is connected to a measuring instrument. The contact-making at the integrated circuit to be tested can in this case take place at a contact terminal of the housing of the integrated circuit or directly on a contact terminal or a contact area on the substrate of the integrated circuit. An application area is also possible in which the contact element which makes contact with a contact terminal of the circuit to be tested is connected at its other contact end directly to a measuring cable, which is routed to the measuring instrument.

Finally, contact elements for high-frequency signals which electrically bypass the contact areas on the substrate of two integrated circuits are also conceivable.

The transmission of a high-frequency signal between the two contact points of the contact element which make contact with the contact terminals or contact areas requires a contact element which has in each case an impedance at the two contact points which corresponds to the input impedance of the associated contact terminal with which contact is to be made. A contact element with such a configuration is matched in terms of its impedance at its contact points to the impedance at the associated contact terminals with which contact is to be made and prevents undesired reflection of the high-frequency signal with which contact is to be made and which is to be transmitted at the contact points.

For the particular case where the matched impedances at the two contact points of the contact element have different values, it is necessary to implement as continuous a transition as possible between these two impedance values within the contact element with a view to minimizing signal reflection. A contact element which is configured so as to minimize reflection in respect of its impedance both at its two contact points and between the two contact points has a set impedance along its longitudinal extent.

Here and in the text which follows, a set impedance of a contact element is understood to mean an impedance which is matched to the impedance of the contact area with which contact is to be made in each case between the two contact points. A preferably constant impedance over the entire longitudinal extent is realized by suitable shaping and material selection of the contact element. In the particular case of a different impedance of the two contact areas with which contact is to be made, a continuous or at least multiply stepped transition between the two different values of a matched impedance at the two contact points of the contact element is implemented by means of shaping and material selection in the contact element.

In addition to the technical requirement of the matched impedance or the set impedance, such a contact element typically also needs to meet other technical requirements:

The profile of the cross-sectional geometry between the inner-conductor signal routing and the outer-conductor signal routing of a high-frequency contact element needs to be embodied so as to be as continuous as possible both at the contact points to the contact terminals with which contact is to be made and between the contact points in order to avoid undesired modes of the high-frequency signal with which contact is to be made and which is to be transmitted.

Contact elements are preferably configured to be elastic in order firstly to compensate for variable spacings between the contact terminals with which contact is to be made and secondly to exert sufficient contact pressure of the contact element on the contact terminals with which contact is to be made.

A multiplicity of contact terminals with which contact is to be made at the same time and having an increasingly smaller grid spacing between the contact terminals requires progressive miniaturization of the contact elements. The miniaturization of the contact elements is additionally accelerated by the increasing decrease in the spacing between the contact terminals with which contact is to be made.

A further requirement in respect of the technical design of contact elements can be considered to be that parallel contact elements make contact with in each case contact terminals of an integrated circuit to be tested with a comparatively small grid spacing and convert these into respectively opposite contact areas with a comparatively larger grid spacing. In this way, simpler fitting of the measuring cables to the contact points of the individual contact elements and simple contact-making with contact terminals or contact areas on a printed circuit board which is connected to the measuring instrument are possible.

The mentioned electrical and mechanical requirements placed on the contact elements necessarily result in very complicated geometries, in very small dimensions and in material combinations which, disadvantageously, cannot be produced using conventional manufacturing technologies. Only comparatively simple geometries for contact elements can be produced technically and at the same time efficiently using conventional manufacturing methods and combinations thereof, such as chip-removal methods, such as, for example, turning and milling, non-cutting forming methods, such as, for example, deep drawing and forging, and separating methods, such as, for example, punching.

The miniaturization of contact elements is also subject to a technical limit using such conventional manufacturing technologies. In many cases, miniaturized contact elements below a certain size cannot be mass-produced.

The conventional production of a high-frequency contact element finally requires individual manufacture of individual component parts, such as, for example, inner conductor element, insulator element and outer conductor element, and subsequent assembly of the individual component parts to form the finished high-frequency contact element. In particular, the assembly still largely takes place manually and considerably increases the cost of the finished product.

Insulator elements which each have integrally a plurality of regions consisting of different materials cannot be manufactured at all using conventional manufacturing technology.

This is a circumstance which needs to be improved.

SUMMARY OF THE INVENTION

Against this background, the present invention is based on the object of developing a method for inexpensive production of a contact element for contact-making and transmission of a high-frequency signal, which is optimized in terms of its electrical and mechanical properties and can also be produced with very small dimensions and with quality. In addition, it is also necessary for the invention to develop a method for inexpensive production of a contact element arrangement for contact-making and transmission of a plurality of high-frequency signals, said arrangement containing a plurality of contact elements, and associated apparatuses.

In accordance with the invention, this object is achieved by a method having the features of patent claim 1.

Accordingly, the following is provided:

A method for producing at least one high-frequency contact element or a high-frequency contact element arrangement comprising at least one such high-frequency contact element, comprising the following method steps:

- producing a basic body part of each high-frequency contact element from a dielectric material using an additive manufacturing method,
- wherein the basic body part has a bushing between a first end and a second end of a longitudinal extent of the basic body part,
- coating the dielectric basic body part with an electrically conductive layer, and
- removing the electrically conductive layer in a region surrounding the bushing at the first end and at the second end of the basic body part so as to form an electrically conductive coating on the outer conductor side and an electrically conductive coating on the inner conductor side.

According to the invention, the basic body part of the high-frequency contact element, which has a bushing between a first end and a second end, is produced from a dielectric material. The basic body part configured in this way represents the insulator element of the high-frequency contact element according to the invention.

The high-frequency contact element is preferably assembled from an integral basic body part. In the case of a multi-piece basic body part, the dielectric individual parts of the basic body part are connected to one another in a suitable manner, for example by means of adhesive bonding, prior to the coating process.

In accordance with the invention, in addition the dielectric basic body part is coated with an electrically conductive layer.

Finally, in accordance with the invention, the electrically conductive layer is removed in a region surrounding the bushing at the first end and at the second end of the basic body part. In this way, advantageously a high-frequency contact element with an inner conductor coating and an outer conductor coating is produced, with the coatings each being electrically insulated from one another by the dielectric material of the basic body part.

The substantial advantage of this method according to the invention consists in that the individual component parts of the high-frequency contact element, i.e. the inner conductor element, the insulator element and the outer conductor element, no longer need to be manufactured individually and then assembled in a comparatively complex manner to form the finished high-frequency contact element. Instead, the high-frequency contact element is produced in three sequential manufacturing steps, which can be automated.

In addition, the production of the basic body part from a dielectric material by means of an additive manufacturing method in comparison with the manufacture of individual parts using a conventional manufacturing technology advantageously makes it possible to realize very complex geometries. These complex geometries can thus additionally advantageously be combined with complex material combinations. Therefore, high-frequency contact elements with complex electrical requirements, in particular complex requirements in respect of impedance matching, in combination with complex mechanical requirements can be met. In addition, extremely miniaturized high-frequency contact elements with very filigree geometry structures can be produced using the method according to the invention. High-frequency contact elements with such a qualitatively high value can only be produced using conventional methods in a very complex manner and therefore at very high cost in single units.

An "additive manufacturing method", which is also referred to as a "generative manufacturing method", will be understood here and in the text which follows to mean a manufacturing method which produces products with high precision and at low cost on the basis of computer-internal data models from a formless (liquids, gels/pastes, powders etc.) or form-neutral (strip-shaped, wire-shaped, sheet-shaped) material by means of chemical and/or physical processes. Although the method is a forming method, no special tools which have stored the respective geometry of the workpiece (for example dies) are required for a specific product.

In order to realize very small geometry structures of the high-frequency contact element, 3D laser lithography is preferably suitable, particularly preferably two-photon laser lithography. With the multi-photon polymerization used here, a photosensitive material, preferably a liquid photosensitive material, particularly preferably a highly viscous photosensitive material, is preferably bombarded by means of a laser with individual laser light strikes and in the process cures at specific points. In this way, the basic body part of the high-frequency contact element is constructed stepwise from the photosensitive dielectric material.

After the production of the dielectric basic body part of the high-frequency contact element by means of additive manufacturing technology, the basic body part is coated with an electrically conductive layer. An electrochemical coating method, for example an electroplating process, is preferably suitable as the coating method. In this case, an electrical circuit between a cathode, which is connected to the body to be electroplated, and an anode consisting of the coating material is constructed in an electroplating bath with an electrolyte. Copper is preferably suitable as coating material. In addition, palladium, silver, gold, nickel, tin or tin-lead can also be used.

In addition to an electrochemical process, a chemical method can also be used for the coating process. In a chemical method, a starting material which has bonded to a carrier gas or dissolved in a liquid reacts, under certain reaction conditions, for example temperature and pressure, with the basic body part consisting of the dielectric material and, as a result of this reaction, produces an electrically conductive layer, preferably a metallic layer.

Finally, a physical method such as, for example, the sputtering method or other evaporation methods can also possibly be used as coating method.

Alternatively, a combination of an electrochemical method with a chemical method or a combination of an electrochemical method with a physical method is also conceivable as an alternative coating process.

For the removal of the electrically conductive layer at a first end and at a second end of the basic body part in a region surrounding the bushing of the basic body part, a mechanical method such as, for example, grinding of the electrically conductive layer using a grinding tool designed suitably for this purpose can be used.

In addition, the removal of the electrically conductive layer can also be performed using a physical or optical method, for example by means of laser ablation or laser evaporation. In this case, the electrically conductive layer is removed from a surface of the basic body part by bombardment with laser radiation. The laser radiation used in this case has a high power density, which results in rapid heating and formation of a plasma on the surface. In this case, the chemical bonds of the electrically conductive layer are broken and/or flung from the surface of the basic body part.

Finally, the electrically conductive layer can also be removed using a chemical method, for example using the so-called lift-off process. For this purpose, a sacrificial layer, preferably consisting of a photoresist, is applied between the electrically conductive layer and the basic body part consisting of dielectric material. The sacrificial layer is removed by means of a wet-chemical process using a solvent, for example acetone. The electrically conductive layer is also lifted off along with the sacrificial layer and washed away.

Advantageous configurations and developments are set forth in the further dependent claims and in the description with reference to the figures of the drawing.

It goes without saying that the features mentioned above and yet to be explained below can be used not only in the respectively specified combination, but also in other combinations or on their own without departing from the scope of the present invention.

In a particular development of the invention, the layer thickness of the coating, i.e. the electrically conductive layer, within the bushing is designed to be comparatively greater than the layer thickness of the coating on the outer lateral surface of the basic body part. In this way, high-frequency signals with a relatively high power level can also be transmitted via the high-frequency contact element. In an extreme case, the coating fills the bushing completely.

In particular when using an electrochemical method, i.e. when using an electroplating process, for functional reasons an electrically conductive starting layer needs to be applied to the electrically insulating material of the basic body part by means of, for example, a chemical method prior to the application of the actual electrically conductive layer.

Therefore, the coating of the dielectric basic body part with an electrically conductive layer preferably includes coating of the dielectric basic body part with a plurality of electrically conductive layers. Each individual electrically conductive layer is preferably in each case a metallic layer. Preferably, the individual metallic layers, i.e. the starting layer and the at least one further metallic layer applied thereto, consist of a different metallic material. By suitable selection of the layer sequences, particularly pronounced electrical and mechanical properties, for example minimized contact resistance or optimized abrasion resistance, can thus be realized in particular in the contact-making regions.

The contact element according to the invention contains the two contact-making regions, which are each used for making electrical contact between the contact areas or contact terminals with which contact is to be made on a printed circuit board, on a substrate or on a housing of an integrated circuit and the connecting region arranged between the two contact-making regions.

The high-frequency contact element is configured in each case elastically in at least one region in order to exert sufficient contact pressure on the contact areas or contact terminals with which contact is to be made and to compensate for variable spacings between the contact areas or contact terminals with which contact is to be made owing to manufacturing tolerances.

The elasticity is preferably formed in the connecting region between the two contact-making regions of the contact element. In addition, it is also possible for only the contact-making regions or the entire contact element to be configured so as to be elastic. Finally, the contact element can also be assembled from individual elastic regions and rigid regions arranged therebetween.

The elasticity in the individual regions of the high-frequency contact element is in this case achieved by a material selection which is suitable for this purpose and/or by shaping suitable for this purpose.

Preferably, the dielectric material of the basic body part is selected to be elastic for this purpose. The preferably metallic coating of the basic body part, with a layer thickness which is comparatively small in comparison with the dimensions of the dielectric basic body part, is matched to the elasticity of the dielectric basic body part. An elastomer, for example silicone or natural rubber, can be used as the dielectric material with elasticity properties.

Geometric forms which impart a certain elasticity to a contact element for high-frequency signal transmission are concentrated on elastic implementations, in which it is possible for the at least one inner conductor to be completely surrounded by a common electrically shielding outer conductor over the entire longitudinal extent of the contact element. In the particular case of a single inner conductor, preferably a coaxial form between the inner conductor and the outer conductor over the entire longitudinal extent of the high-frequency contact element is desirable. In all of these cases, preferably a form like a torsion spring or a spring arm is suitable. In a particular embodiment, the spring arm can also be formed in meandering fashion from at least three turns or loops. Owing to the meandering shape, the elasticity of the contact element is additionally increased with each added turn or loop.

In respect of the realization of the two contact-making regions of the contact element, there is firstly a single-part solution, in which the basic body part surrounds both the two contact-making regions and the connecting region connecting the two contact-making regions. Secondly, a multi-part solution is also possible, in which in each case a separate component part for contact-making is fastened to the basic body part in the region in which contact is made. This separate component part for contact-making can likewise be constructed from a dielectric material by means of additive manufacturing technologies and then a metallic coating produced. Alternatively, however, any suitable conventional metal-processing technology or any design and layer technology known from the semiconductor sector can also be used here.

In the case of a single-part solution of the high-frequency contact element according to the invention, the two contact-making regions in the simplest technical realization are each realized in the form of first and second ends of the contact element which are formed on the end-face side and which are provided with in each case at least one metallic layer on the inner conductor side and on the outer conductor side. In this way, in each case one end-face contact with associated contact terminals or contact areas on the inner conductor side and on the outer conductor side on a printed circuit board, an IC substrate or an IC housing is possible.

In addition, the contact-making regions of the high-frequency contact element can also have relatively complex forms owing to the varied possible geometric implementations of the additive manufacturing technology. A plurality of contact tips which are preferably arranged in the form of a circle in the contact-making region on the outer conductor side are particularly conceivable for contact-making on the outer conductor side. In each case one ring-shaped form with a conically formed contact-making edge can be used on the inner conductor side and on the outer conductor side in place of contact tips. In both cases, punctiform or linear contact between the respective contact-making region of the contact element and the contact area with which contact is to be made in each case is thus implemented, with this contact enabling reliable contact to be made even in the case of uneven contact areas.

Elastic contact-making regions can also be implemented using a single-part solution when using the additive manufacturing technology, in each case on the inner conductor side and on the outer conductor side. For this purpose, in each case a plurality of geometric forms which build on the spring arm principle are realized in the contact-making region on the inner conductor side and on the outer conductor side.

In a particular contact-making embodiment for a single-part solution of the high-frequency contact element according to the invention, the contact-making region on the inner conductor side and on the outer conductor side has contact-making which is directed in a radial extent of the basic body part. In this case, the contact-making region on the inner conductor side makes contact with one contact area and the contact-making region on the inner conductor side makes contact with a plurality of contact areas.

Preferably, the contact areas with which contact is to be made are in each case formed spherically and represent the contact surface of an electrically conductive ball, preferably an electrically conductive solder ball, which are electrically and mechanically connected to a printed circuit board, an IC housing or an IC substrate. In this case, in the case of a coaxial contact element, one solder ball is provided for the contact-making on the inner conductor side and a plurality of solder balls are provided for the contact-making on the outer conductor side, with the latter solder balls each being arranged in a concentric circle around the solder ball for the inner conductor contact-making. The diameter of the solder ball for the inner conductor contact-making is matched to the inner diameter of the coated bushing of the contact element. In the case of a high-frequency contact element for transmitting at least one differential high-frequency signal, in each case one solder ball needs to be provided for making contact with each individual inner conductor. The solder balls for the outer conductor contact-making need to be arranged in such a way that they surround all of the solder balls for the inner-conductor contact-making on a closed line.

In respect of improved touching contact or improved mechanical fixing of the high-frequency contact element according to the invention to the solder balls with which contact is to be made, the dielectric basic body part of the high-frequency contact element according to the invention preferably needs to be provided in each case with a bevel or step in the region of the contact region on the inner conductor side and on the outer conductor side. In this case, the contact-making includes not only a radially directed component but also an axially directed component.

Instead of an electrically conductive solder ball, it is alternatively also possible to use a conically formed and electrically conductive body, for example a body in the form of a cone or a truncated cone. In the case of a contact-making region of the high-frequency contact element according to the invention which is configured to be elastic, it is alternatively also possible to use a cylindrical body.

In the case of a multi-part realization of the high-frequency contact element according to the invention, component parts for contact-making can likewise be realized in each case as contact tips or ring-shaped bodies with a conically formed contact-making edge. These component parts for contact-making are connected to the coated basic body part, preferably by means of soldering, in the contact-making region on the inner conductor side and on the outer conductor side of the high-frequency contact element according to the invention. Contact crowns can also be used as component parts for contact-making on the inner conductor side and on the outer conductor side.

Contact-making regions with elasticity can preferably be formed in each case as dome-shaped component parts for contact-making on the inner conductor side and on the outer conductor side. In addition, other geometric forms which realize elasticity, such as, for example, forms in the shape of spring arms, plate springs or bending springs, can also be used.

The component parts for contact-making are produced separately in an additive or conventional manufacturing process and are supplied with the dielectric basic body part to the additive manufacturing process for producing the high-frequency contact element.

With a view to optimizing the high-frequency transmission characteristic of the high-frequency contact element according to the invention, preferably the following technical measures in accordance with the invention should be noted, which cannot be managed using conventional manufacturing technologies or can only be produced in a very complex manner. In this case, the impedance of the high-frequency contact element in the two contact-making regions and in certain sections between the two contact regions along the longitudinal extent of the high-frequency contact element is fixed in each case by suitable selection of the dielectric material of the basic body part and by a suitable geometric form of the dielectric basic body part.

Given an identical input impedance and different geometric dimensions of the contact areas on the inner conductor side and on the outer conductor side with which contact is to be made by means of the high-frequency contact element according to the invention, in each case preferably a continuous change in a diameter on the inner conductor side and a diameter on the outer conductor side of the high-frequency contact element is formed between the first end and the second end of the contact element with a view to impedance matching a high-frequency contact element with a coaxial configuration. The ratio between the diameter on the inner conductor side and the diameter on the outer conductor side of the high-frequency contact element is in this case designed to be constant between the first end and the second end of the contact element. In this way, a constant impedance over the entire longitudinal extent of the high-frequency contact element according to the invention is made possible, said impedance corresponding to the input impedance of the two contact areas with which contact is to be made. Therefore, reflection-minimized transmission which is therefore optimized in terms of high frequencies is provided in the contact element according to the invention.

Alternatively, given an identical input impedance and different geometric dimensions of the contact areas on the inner conductor side and on the outer conductor side with which contact is to be made by means of the high-frequency contact element according to the invention, in each case an at least single-step change in a diameter on the inner conductor side and a diameter on the outer conductor side of the high-frequency contact element is formed between the first end and the second end of the high-frequency contact element, which is preferably formed so as to be rotationally symmetrical, in the case of a high-frequency contact element with a coaxial configuration.

If both the input impedances and the geometric dimensions of the two contact areas on the inner conductor side and on the outer conductor side with which contact is to be made differ in each case from one another, a continuous or multiply stepped change in a diameter on the inner conductor side and a diameter on the outer conductor side of the high-frequency contact element with a coaxial configuration is formed between the first end and the second end of the high-frequency contact element. In this way, the impedance in the connecting region of the high-frequency contact element between the two contact-making regions of the high-frequency contact element is brought close, continuously or in multiply stepped fashion, to the two different input impedances of the contact areas with which contact is to be made. In this way too, reflection-minimized transmission which is therefore optimized in terms of high frequencies is present in the high-frequency contact element according to the invention.

A multiply stepped change in the impedance along the longitudinal extent of the high-frequency contact element can be implemented in the case of a coaxial high-frequency contact element by virtue of the fact that the diameter on the inner conductor side and on the outer conductor side of the high-frequency contact element with a coaxial configuration according to the invention are in each case designed to be constant in individual sections of the high-frequency contact element. In addition, the diameter on the inner conductor side and on the outer conductor side of the high-frequency contact element with a coaxial configuration according to the invention changes in each case in successive sections with the same ratio.

As an alternative to or in addition to this geometric change in the dielectric basic body part, the dielectric basic body part can be constructed from layers which are successive in the direction of the longitudinal axis of the basic body part, said layers each being produced from a dielectric material with a changed relative permittivity.

Instead of the use of a dielectric material with in each case a different relative permittivity in the individual layers, alternatively or additionally at least one cavity can be formed within the dielectric basic body part along the longitudinal extent of the high-frequency contact element. Each of these cavities is filled with a further dielectric material with a relative permittivity which differs from, is preferably less than, the relative permittivity of the dielectric material of the basic body part. Preferably, air is used for the filling. Alternatively, another gaseous substance or a liquid substance or a solid dielectric material can be used. By virtue of the single cavity, in this way the absolute permittivity of the high-frequency contact element along the longitudinal extent of the high-frequency contact element in which the respective cavity is formed can be reduced in a suitable manner. By virtue of suitable arrangement and geometric dimensioning of the at least one cavity along the longitudinal extent of the high-frequency contact element, therefore, the impedance can be kept constant given changing diameters on the inner conductor side and on the outer conductor side in order to match said impedance to the identical self-impedance of the two contact areas with which contact is to be made by means of the high-frequency contact element according to the invention. In the case of in each case different self-impedances of the two contact areas with which contact is to be made by means of the high-frequency contact element according to the invention, alternatively a continuous or multiply stepped change characteristic of the impedance can be achieved by arrangement and geometric configuration of the at least one cavity.

Instead of cavities which are completely surrounded by the dielectric material of the basic body part, slots within the basic body are alternatively also conceivable, said slots in each case running over the entire radial extent of the basic body part. In order to prevent metallic coating of slots arranged and formed in such a way during the coating process, these slots need to be filled with a dielectric material during the production process of the basic body part by means of additive manufacturing technology, with this dielectric material being selectively removable again, in contrast to the dielectric material of the rest of the basic body part. Therefore, sacrificial layers consisting of a suitable dielectric material, for example consisting of a light-sensitive photoresist, are constructed additively within the basic body part for such slots. After the metallic coating of the entire basic body part, the metallic coating is removed in the sections of the slots filled with dielectric sacrificial layers by means of known methods, for example by means of laser ablation. In order to identify these sections, these sections have, for example, a curved surface, i.e. a concave or a convex surface, in comparison with the rest of the sections of the basic body part. Once the metallic coating has been removed in the sections of the sacrificial layers, the sacrificial layers are removed using a suitable solvent, for example acetone, while the remaining regions of the basic body part consisting of an insoluble dielectric material cannot react with the solvent. In this way, slots are produced within the basic body part which extend as far as to the side rim of the coated basic body part. By virtue of suitable arrangement and geometric configuration of such slots, the absolute permittivity of the dielectric basic body part and therefore the characteristic of the impedance of the high-frequency contact element according to the invention along its longitudinal extent can be influenced in a targeted manner.

If in this way a plurality of parallel slots extending in the longitudinal direction of the basic body part are realized which additionally reach from the side wall on the inner conductor side to the side wall on the outer conductor side of the high-frequency contact element according to the invention, advantageously the elasticity of the high-frequency contact element according to the invention can be additionally increased. In the event that the high-frequency contact element is upset in its longitudinal direction, the circumference of the high-frequency contact element can advantageously be widened slightly in the region of the slots. In addition to the removal of the metallic coating on the outer conductor side in the region of the slots, in this case it is also necessary to remove the metallic coating on the inner conductor side.

The two contact terminals or contact areas with which contact is to be made by means of the high-frequency contact element can not only be arranged with a specific axial spacing with respect to one another in the direction of the longitudinal axis of the contact element, but also, in real applications, can be arranged so as to be axially offset with respect to one another in respect of their areal axes and/or can have an angular offset with respect to the orientation of their areal axes. In these cases, the high-frequency contact element no longer extends along a longitudinal axis, but can have a profile with a more complicated form. Such a variable longitudinal extent of the high-frequency contact element can on the one hand be realized continuously with suitably dimensioned curvatures. On the other hand, such a high-frequency contact element can also be assembled in stepped fashion from individual sections, which each run along an associated longitudinal axis and have an associated orientation with respect to one another.

Both cases of a variable longitudinal extent of the high-frequency contact element can be produced using a dielectric basic body part produced by means of an additive manufacturing method with little complexity and with a high technical production quality even into the nanometers range.

In addition to a high-frequency contact element according to the invention, a high-frequency contact element arrangement according to the invention which is assembled from individual high-frequency contact elements according to the invention can also be realized.

The individual high-frequency contact elements are connected in this case by means of a connecting part. This connecting part may be, for example, a common connecting plate consisting of a dielectric material, in which the individual high-frequency contact elements are arranged with a specific grid spacing and mechanically fixed. Alternatively, the connecting part may also be a connecting web consisting of a dielectric material, which connects two high-frequency contact elements arranged with a specific grid spacing to one another and therefore spaces them apart from one another with a specific grid spacing.

The connecting plate and the individual connecting webs can be produced together with the basic body parts of the individual high-frequency contact elements in a common manufacturing step by means of additive manufacturing technology. Alternatively, the connecting plate or the individual connecting webs can be pre-manufactured by means of additive or conventional manufacturing technology and supplied to the additive manufacturing process for production of the high-frequency contact element arrangement.

If the connecting plate and the individual connecting webs are used in each case only as a so-called supporting geometry for mutual support and spacing-apart of the individual basic body parts in the additive manufacturing process, in a final manufacturing step the individual high-frequency contact elements are separated from the connecting plate or from the connecting webs. For easier separation, the connecting plate or the connecting webs each have a desired breaking point at a suitable point. The separation can take place mechanically by means of milling or grinding or optically by means of a laser. In a preferred embodiment of the invention, the separation of the individual high-frequency contact elements from one another can take place in the same manufacturing step as the removal of the metallic layer at the first and second ends of the individual high-frequency contact elements.

If the individual high-frequency contact elements remain permanently connected to the connecting plate, there is a high-frequency contact element arrangement, which is also referred to as an interposer arrangement. The connecting plate can be arranged at any desired position in the longitudinal extent of the individual high-frequency contact elements. In the case of high-frequency contact elements with a relatively large longitudinal extent, it is possible, with a view to improved fixing and support of the individual high-frequency contact elements, for a plurality of connecting plates to be provided at individual positions in the longitudinal extent of the individual high-frequency contact elements.

Finally, a high-frequency contact element arrangement is also possible in which in each case one high-frequency contact element is arranged at individual opposite positions on the upper side and lower side of the connecting plate. These two opposite high-frequency contact elements are each connected to one another in terms of high frequencies via a metal-coated bore and form a pair of high-frequency contact elements for electrical contact-making and transmission of a high-frequency signal between contact areas with which contact is to be made on a printed circuit board, an IC substrate or an IC housing.

In a preferred extension of the invention, the connecting plate is implemented as an electrical circuit carrier and has in each case electrical signal lines on its upper side and/or lower side. Direct contact can be made between the outer conductor of the high-frequency contact element and an adjacent contact area or an adjacent contact terminal of an electrical signal line. Contact is made between the inner conductor of the high-frequency contact element and an associated contact area or an associated contact terminal of an electrical signal line via a signal line within the connecting plate. This signal line is connected to the metallic coating of two bores within the connecting plate, of which one bore is aligned with the high-frequency contact element and the other bore is aligned with the associated contact area on the upper or lower side of the connecting plate.

In a particular embodiment of a high-frequency contact element arrangement, the individual high-frequency contact elements are additionally mounted elastically by means of a separate elastic element. This separate elastic element is connected to the high-frequency contact element according to the invention in the connecting region between the two contact-making regions of the high-frequency contact element and to the connecting plate at a suitable terminal point. A torsion spring which is suitably configured to enable the high-frequency contact element to have sufficient elasticity can preferably be used as the elastic element.

If the connecting plate is connected to high-frequency contact elements which each have a marked longitudinal extent in a transverse direction with respect to the connecting axis between the two contact areas with which contact is to be made, such a high-frequency contact element arrangement according to the invention can be used as a so-called space translator assembly. A space translator assembly is understood to mean an assembly which implements in each case electrical contact-making between contact areas, which are each arranged with a first grid spacing and with which contact is to be made, and associated contact areas, which are each arranged with a second grid spacing and with which contact is to be made. The first grid spacing is in this case different than the second grid spacing.

The above configurations and developments can, where expedient, be combined with one another as desired. Further possible configurations, developments and implementations of the invention also include combinations which are not explicitly mentioned of features of the invention which are described above or below with respect to the exemplary embodiments. In particular, in this case a person skilled in the art will also add individual aspects as improvements or additions to the respective basic form of the present invention.

LIST OF CONTENTS OF THE DRAWING

Figure 1B:
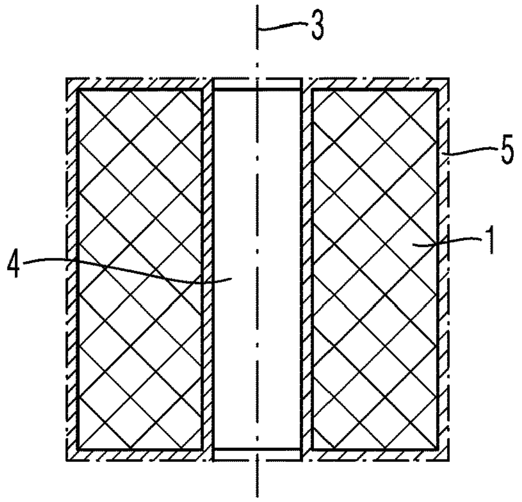
Figure 1C:
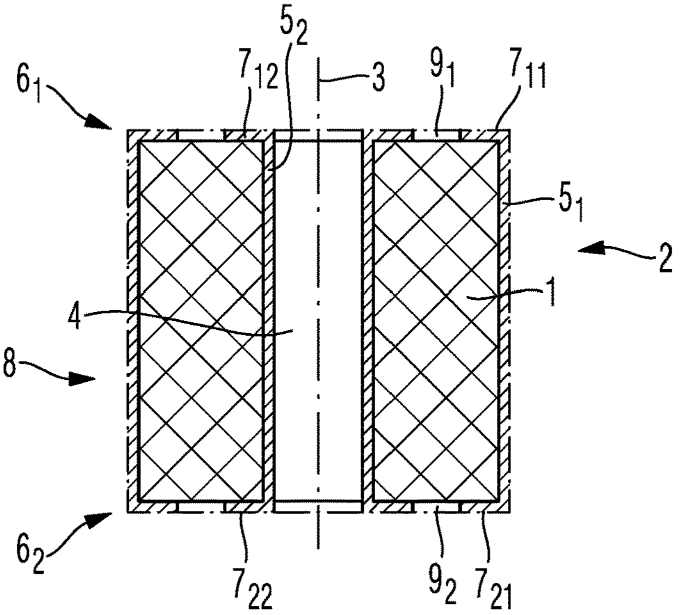
Figure 2A:
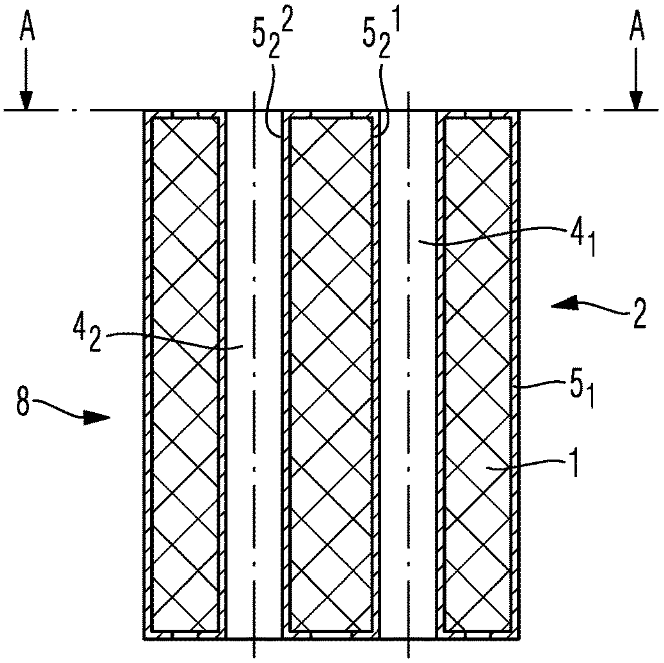
Figure 2B:
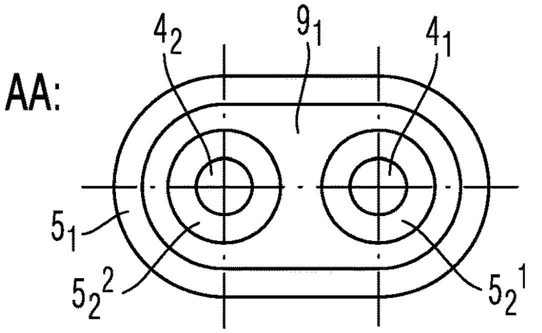
Figure 3:
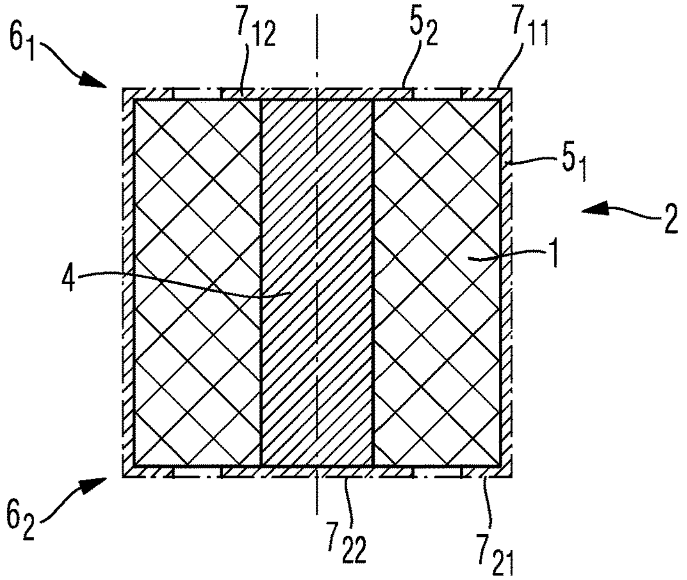
Figure 4A:
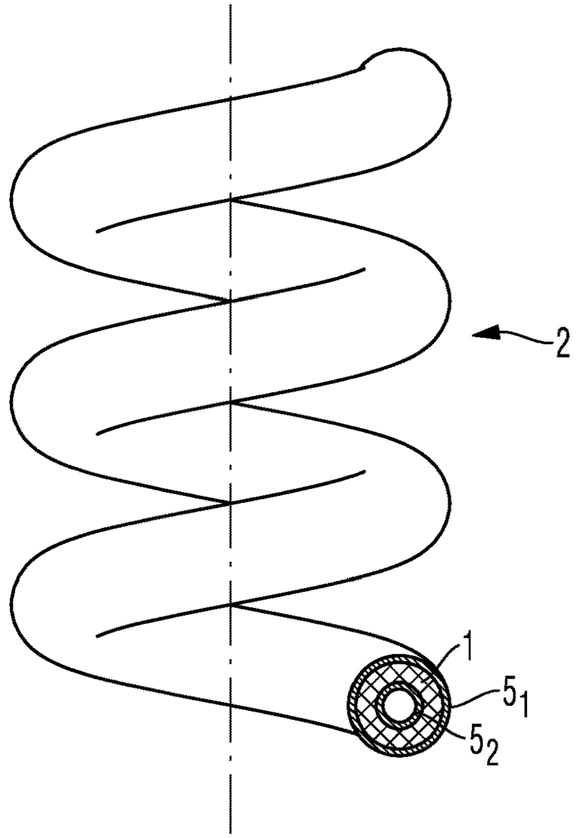
Figure 4B:
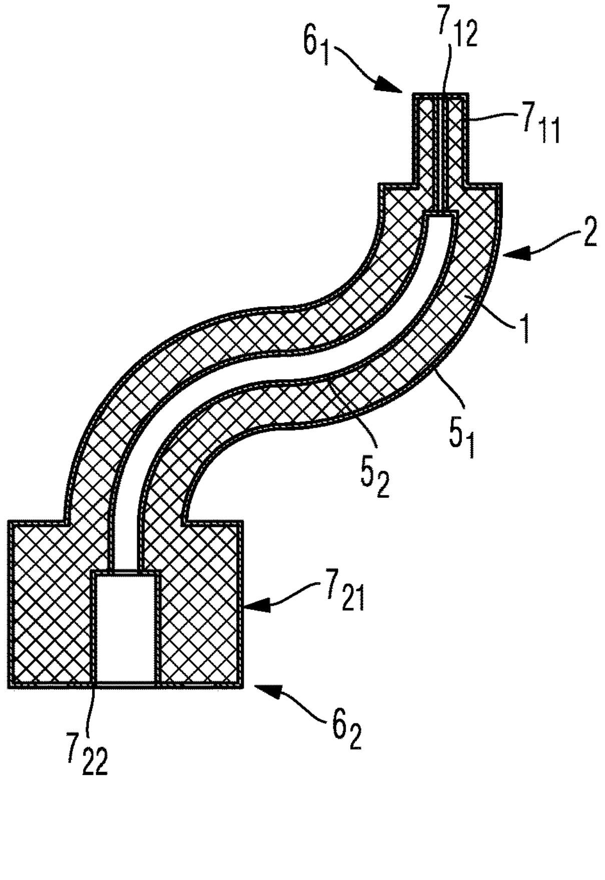
Figure 5A:
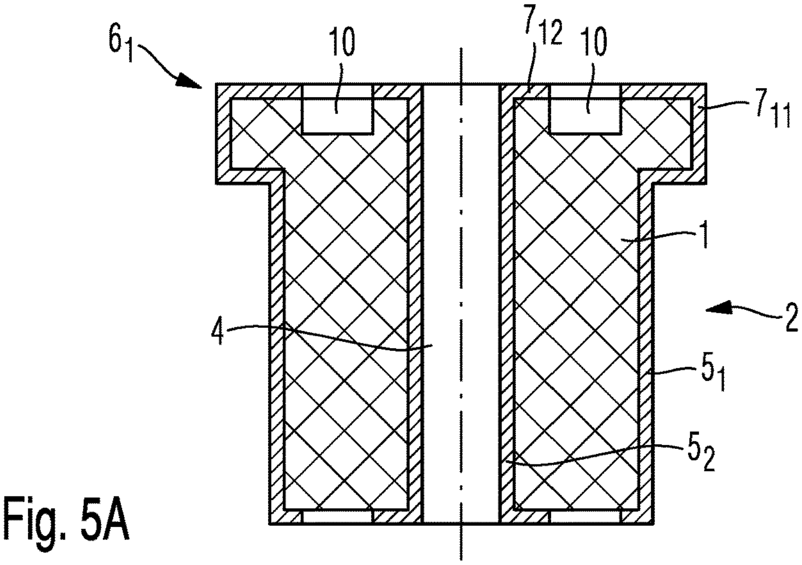
Figure 5B:
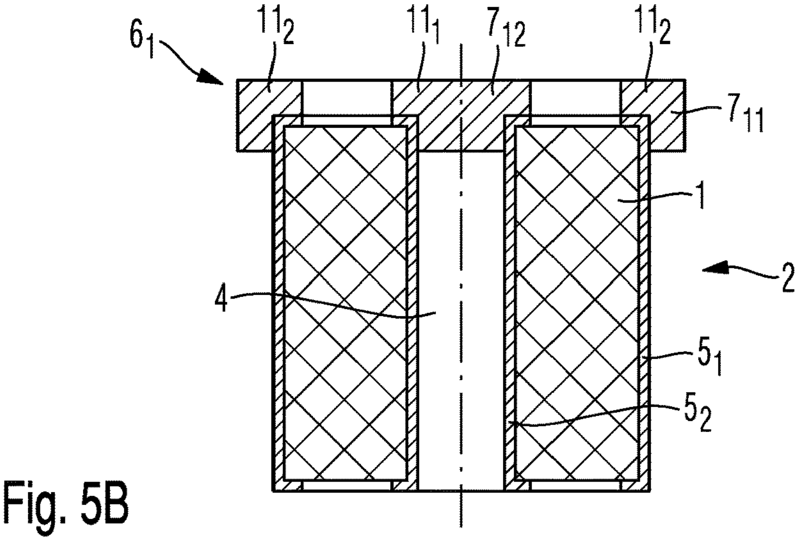
Figure 5C:
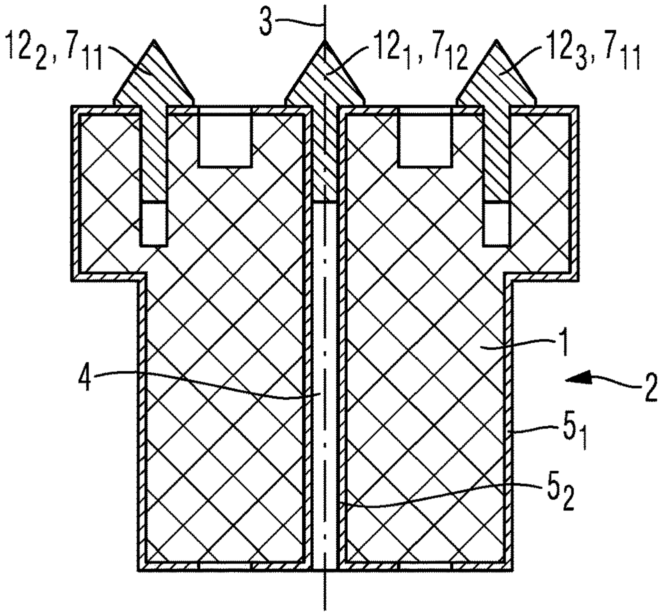
Figure 5D:
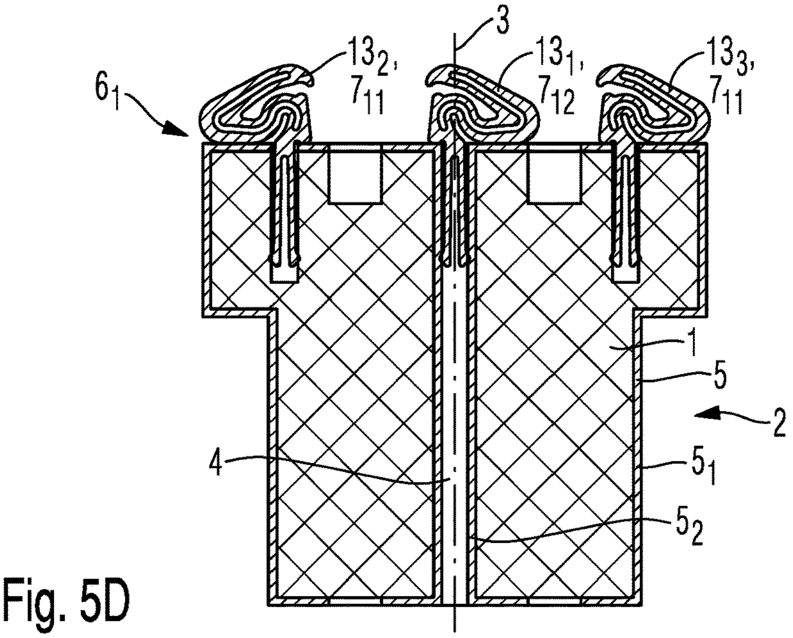
Figure 5E:
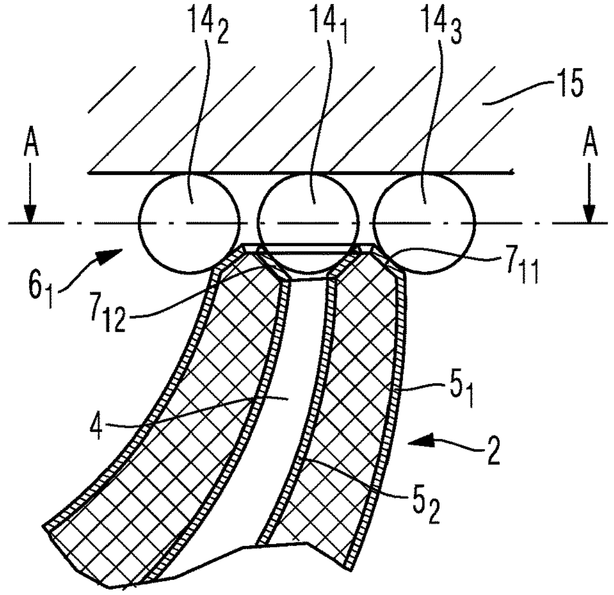
Figure 5F:
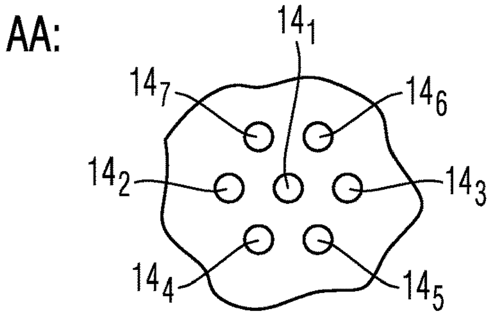
Figure 6A:
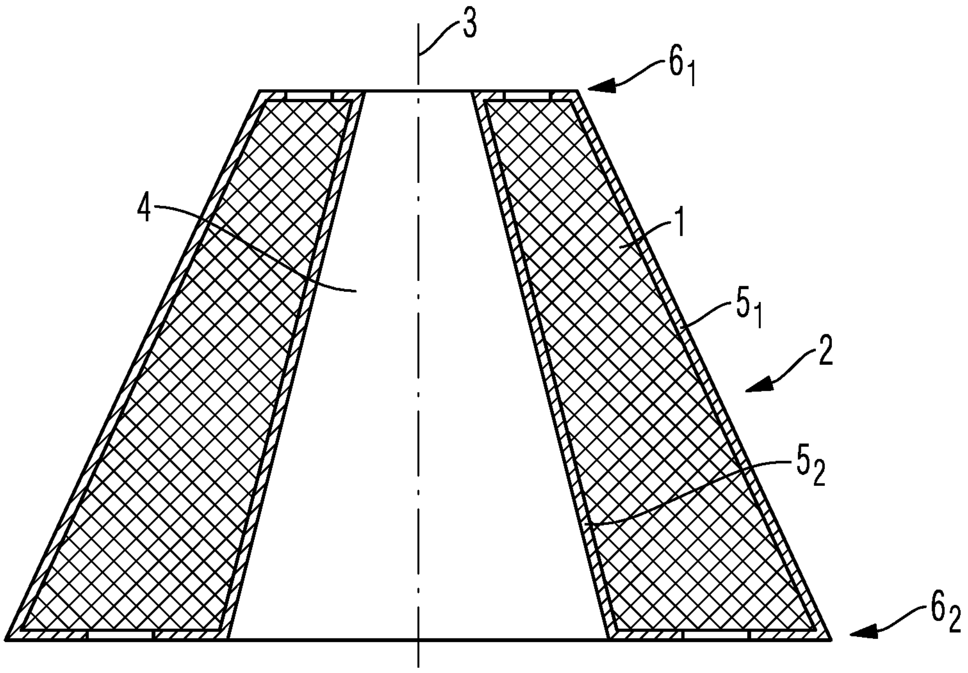
Figure 6B:
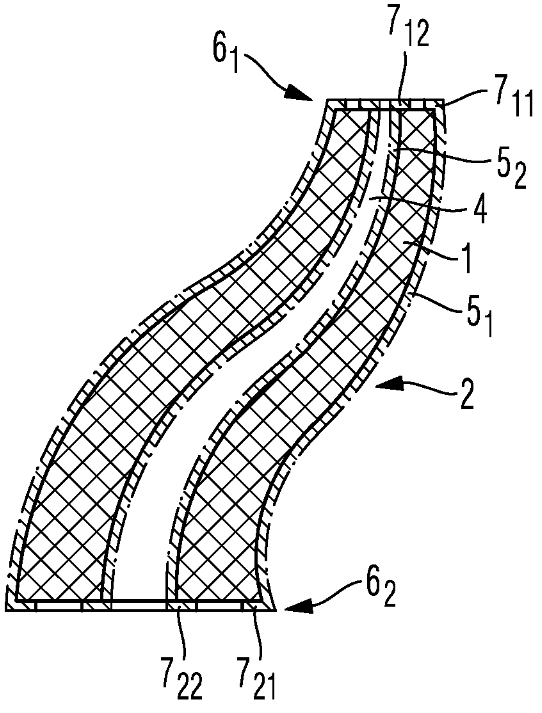
Figure 6C:
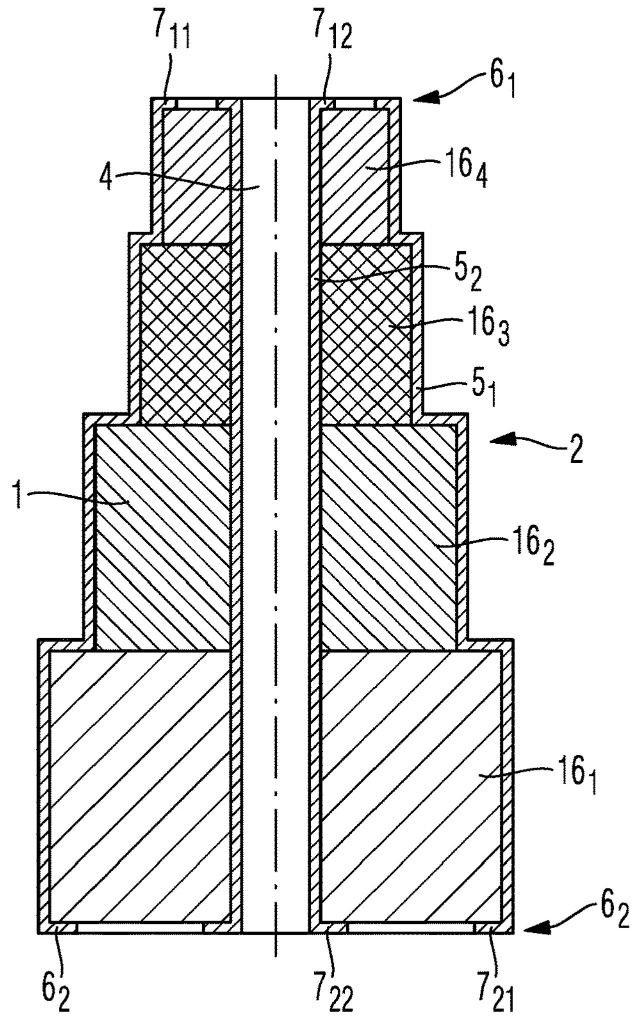
Figure 6D:
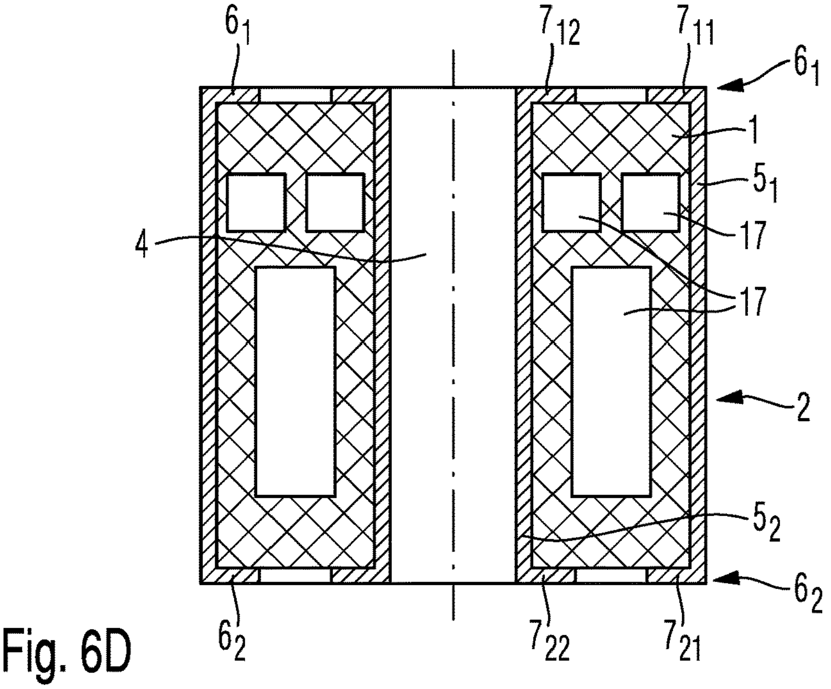
Figure 6E:
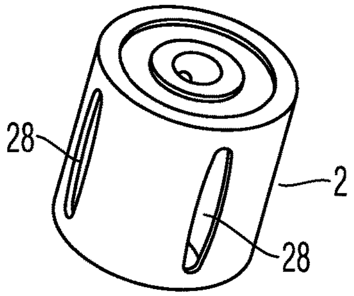
Figure 6F:
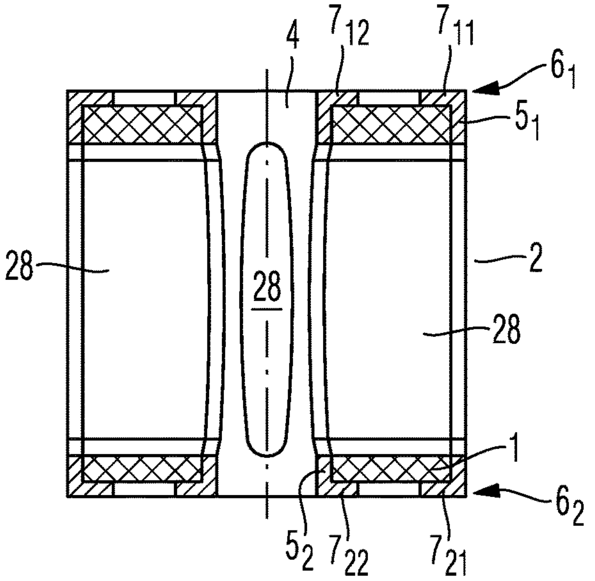
Figure 6G:
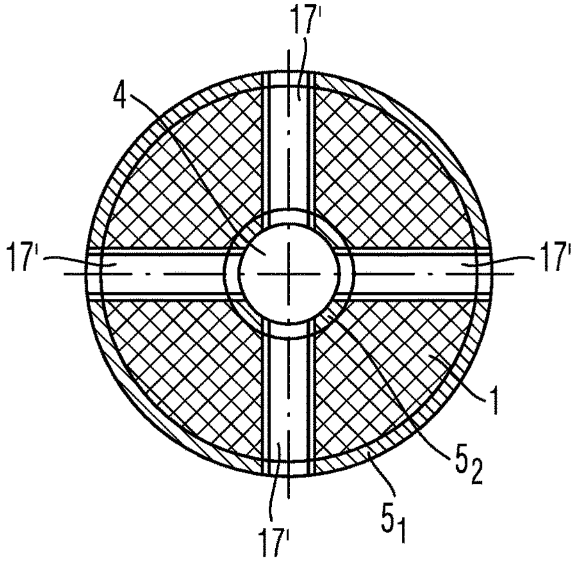
Figure 7:
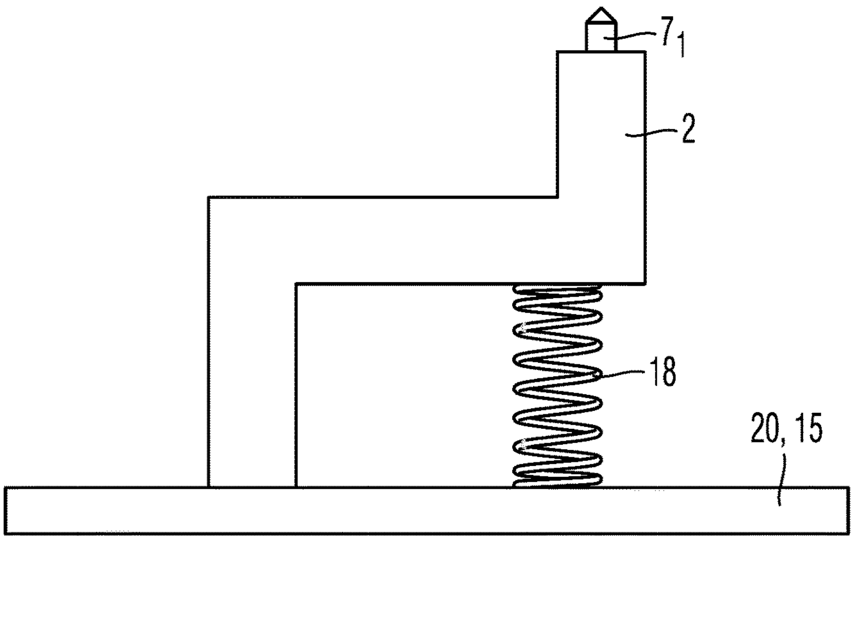
Figure 8A:
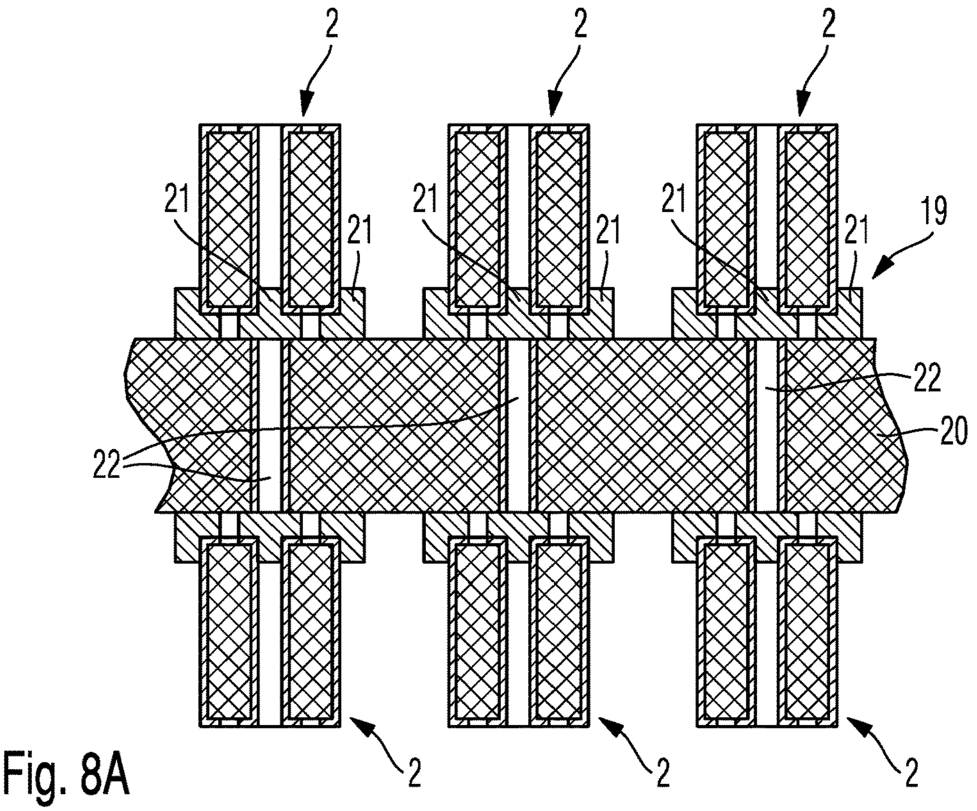
Figure 8B:
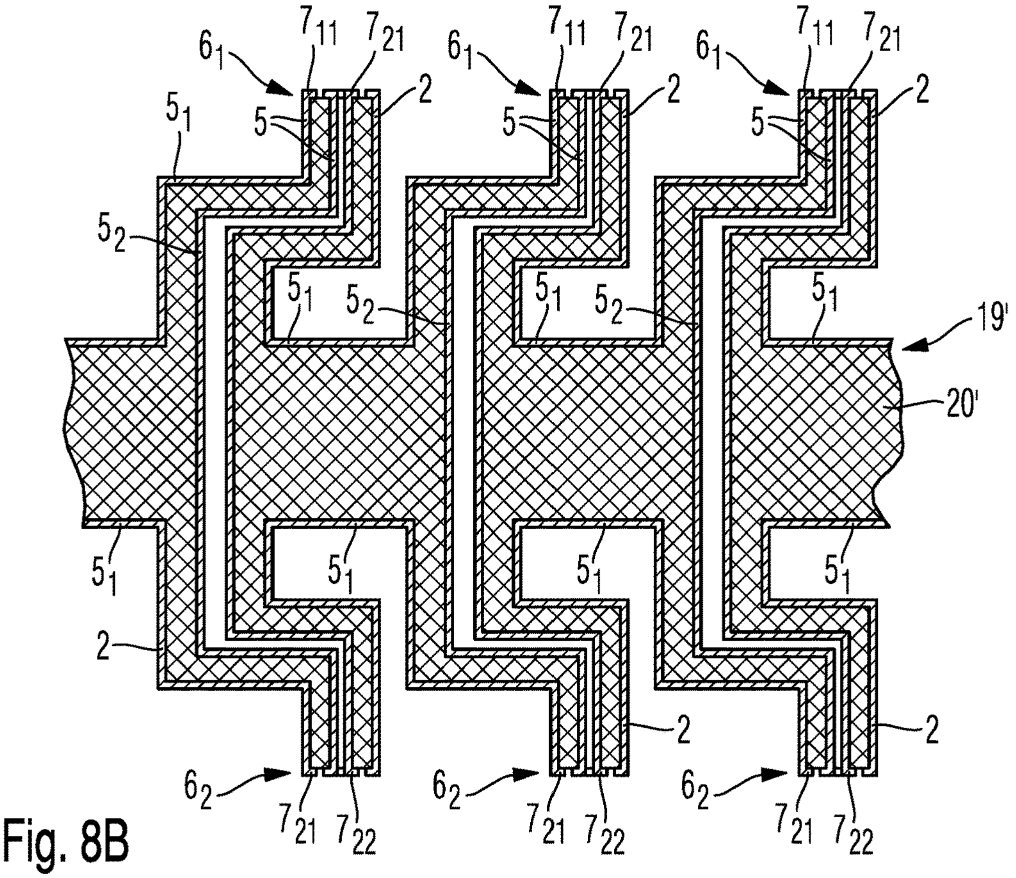
Figure 8C:
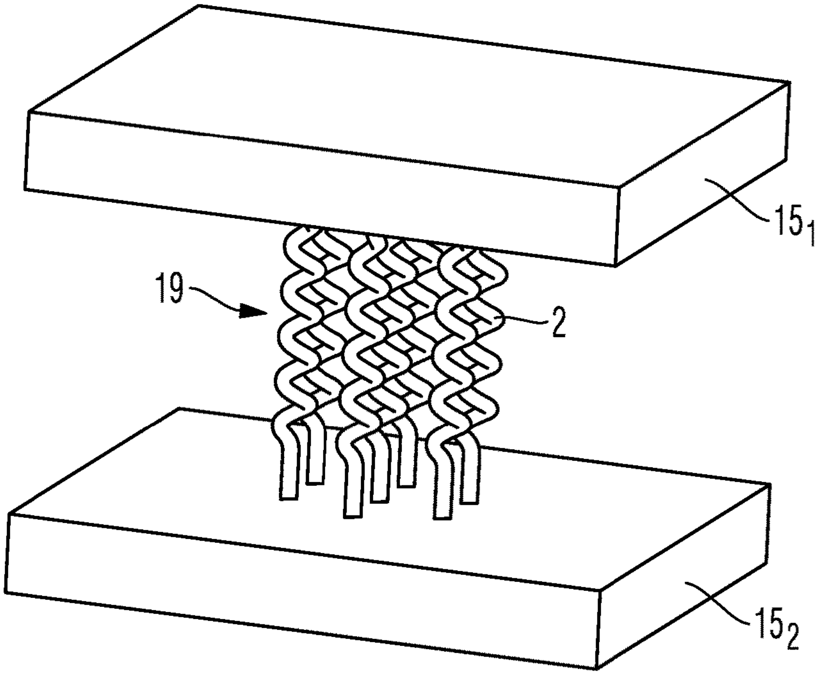
Figure 8D:
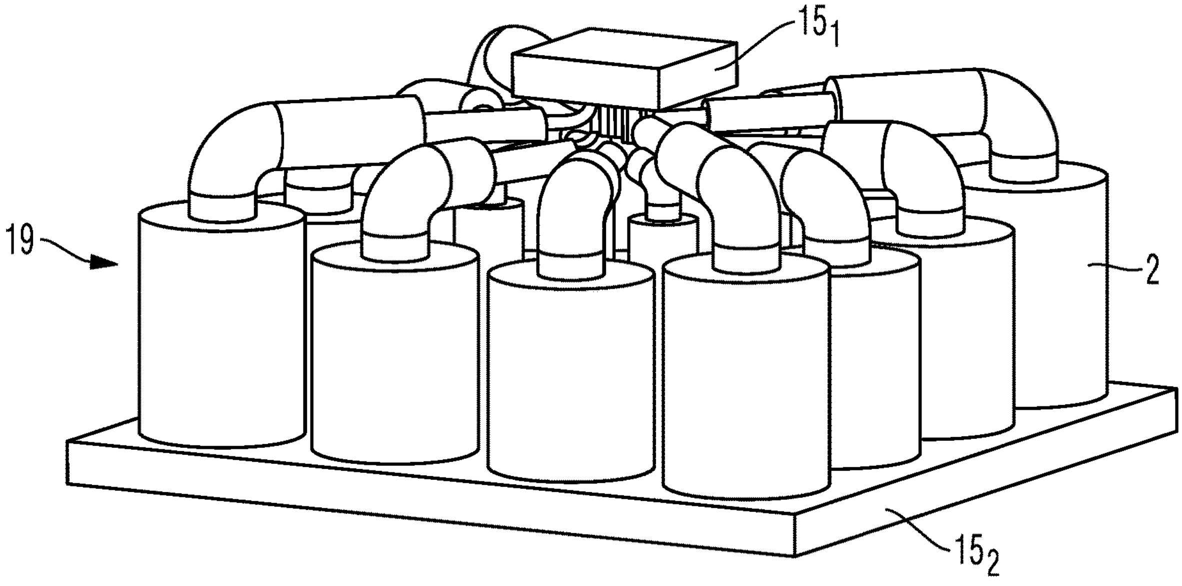
Figure 8E:
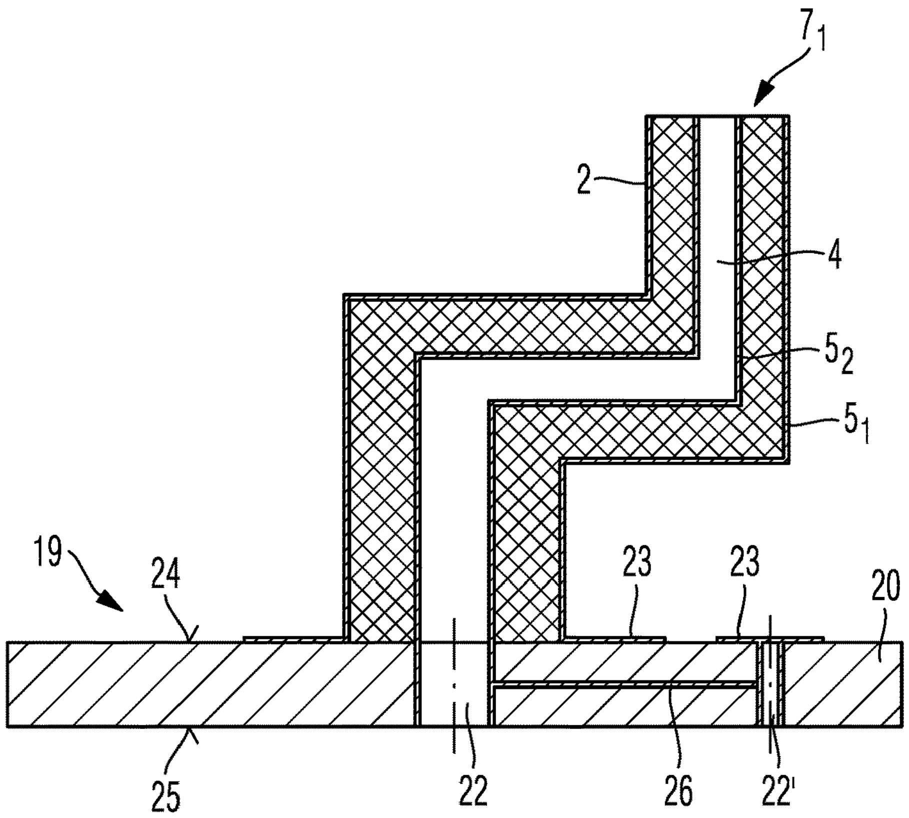
Figure 8F:
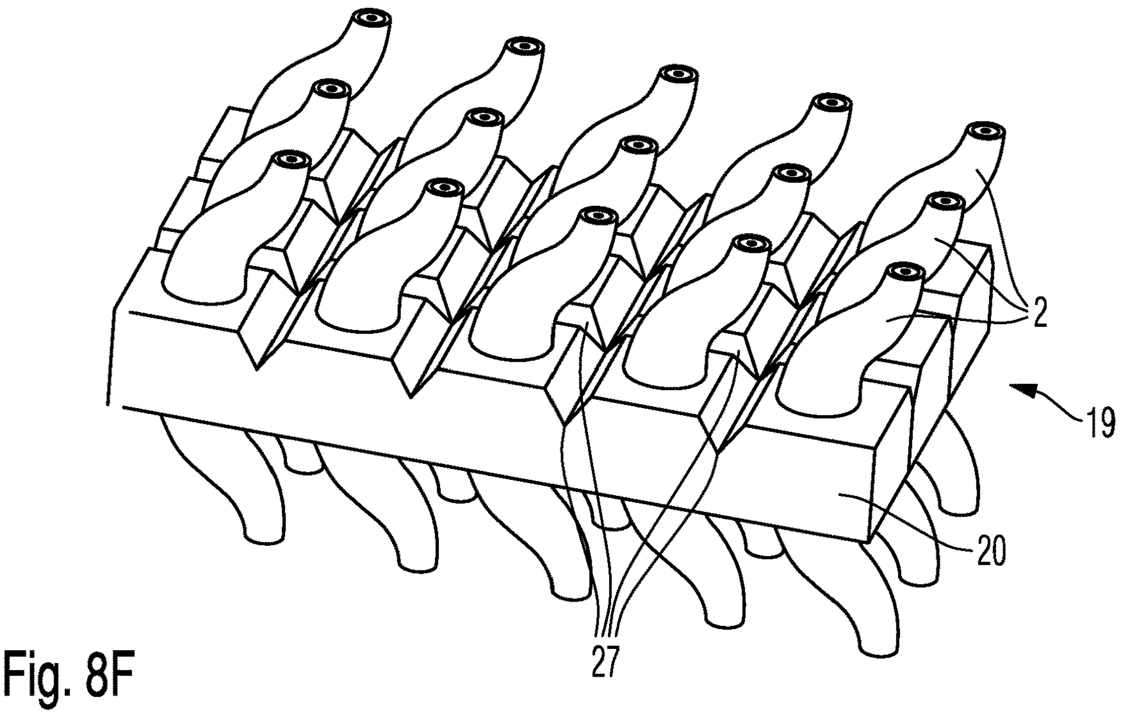

The present invention will be explained in more detail below with reference to the exemplary embodiments specified in the schematic figures of the drawing, in which:

FIG. 1A, 1B, 1C show a cross-sectional illustration of the high-frequency contact element according to the invention in the individual manufacturing steps of the method according to the invention, FIG. 2A, 2B show a vertical and a horizontal cross-sectional illustration of the high-frequency contact element according to the invention for contact-making and transmission of a differential signal, FIG. 3 shows a cross-sectional illustration of the high-frequency contact element according to the invention with the inner conductor bore completely filled, FIG. 4A shows an isometric illustration of a first embodiment of a high-frequency contact element according to the invention with elasticity, FIG. 4B shows a cross-sectional illustration of a second embodiment of a high-frequency contact element according to the invention with elasticity, FIG. 5A shows a cross-sectional illustration of a high-frequency contact element according to the invention with end-face contact-making, FIG. 5B shows a cross-sectional illustration of a high-frequency contact element according to the invention comprising contact crowns, FIG. 5C shows a cross-sectional illustration of a high-frequency contact element according to the invention comprising contact tips, FIG. 5D shows a cross-sectional illustration of a high-frequency contact element according to the invention comprising elastic component parts for contact-making, FIG. 5E, 5F show a cross-sectional illustration of a high-frequency contact element according to the invention comprising solder balls with which contact is to be made and the arrangement of said solder balls on a printed circuit board, FIG. 6A shows a cross-sectional illustration of a high-frequency contact element according to the invention with a first variant of impedance matching, FIG. 6B shows a cross-sectional illustration of a high-frequency contact element according to the invention with a second variant of impedance matching, FIG. 6C shows a cross-sectional illustration of a high-frequency contact element according to the invention with a third variant of impedance matching, FIG. 6D shows a cross-sectional illustration of a high-frequency contact element according to the invention with a fourth variant of impedance matching, FIG. 6E shows an isometric illustration of an elastic high-frequency contact element according to the invention with a fifth variant of impedance matching, FIG. 6F, 6G shows a vertical and a horizontal cross-sectional illustration of an elastic high-frequency contact element according to the invention of a fifth variant of impedance matching, FIG. 7 shows a side view of an elastic high-frequency contact element according to the invention comprising additional spring-mounting, FIG. 8A shows a cross-sectional illustration of a first variant of a high-frequency contact element arrangement according to the invention, FIG. 8B shows a cross-sectional illustration of a second variant of a high-frequency contact element arrangement according to the invention, FIG. 8C shows an isometric illustration of a high-frequency contact element arrangement according to the invention comprising elastic high-frequency contact elements, FIG. 8D shows an isometric illustration of a high-frequency contact element arrangement according to the invention comprising stepped and angled high-frequency contact elements, FIG. 8E shows a cross-sectional illustration of a high-frequency contact element arrangement according to the invention comprising electrical circuitry, and FIG. 8F shows an isometric illustration of a high-frequency contact element arrangement according to the invention comprising desired breaking points.

The attached figures in the drawing are intended to impart further understanding of the embodiments of the invention. They illustrate embodiments and, in connection with the description, are used to explain principles and concepts of the invention. Other embodiments and many of the mentioned advantages can be seen from the drawings. The elements in the drawings are not necessarily shown true to scale with respect to one another.

Identical, functionally identical and identically acting elements, features and components have each been provided with the same reference symbols in the figures in the drawing, where no mention is made to the contrary.

The figures will be described contiguously and comprehensively below.

DESCRIPTION OF EXEMPLARY EMBODIMENTS

In the text which follows, the principle of the method according to the invention for producing a high-frequency contact element will be explained with reference to FIGS. 1A to 1C:

In a first manufacturing step shown in FIG. 1A, a basic body part 1 of the high-frequency contact element 2 according to the invention is produced from a dielectric material. The basic body part 1 has a bushing 4 in the direction of its longitudinal axis 3. In the cross-sectional illustrations shown in FIGS. 1A to 1C, the basic body part 1 has a single bushing 4, which runs along the longitudinal axis 3. The geometry of the dielectric basic body part 1 does not necessarily need to be hollow-cylindrical, as is illustrated in FIGS. 1A to 1C for reasons of simplicity.

Preferably, the geometry of the basic body part 1 is formed so as to be rotationally symmetrical with respect to the longitudinal axis 3 in order to realize concentricity between the inner conductor coating and the outer conductor coating of the high-frequency contact element 2 according to the invention with the basic body part 1 acting as insulator element. This concentricity is an essential prerequisite for optimized, in terms of high frequencies, contact-making and transmission in an HF contact element. On the basis of this rotationally symmetrical basic geometry of the basic body part 1, with a view to further mechanical and high-frequency-related optimization of the high-frequency contact element according to the invention, further technically expedient geometric modifications can be performed, as is demonstrated below. In this case, comparatively complicated technical geometries and miniaturized forms as far as into the nanometers range can be realized by means of the use of additive manufacturing technologies in the production of the basic body part 1.

In a further manufacturing step as shown in FIG. 1B, the dielectric basic body part 1 is coated with an electrically conductive coating 5, preferably a metallic coating 5. The coating 5 completely surrounds the dielectric basic body part 1. Even in the case of comparatively complex geometric forms of the basic body part 1, the entire outer surface of the basic body part 1 is provided with a metallic coating 5 without any gaps. The metallic coating 5 typically contains a metallic layer. When using an electrochemical coating method, the dielectric basic body part 1 needs to be coated with an electrically conductive, preferably a metallic, starting layer by means of a non-electrochemical coating method.

In addition, the dielectric basic body part 1 can have in each case a plurality of metallic layers over the entire surface or preferably selectively in certain regions in order to achieve particular mechanical and electrical properties by virtue of this multiple coating. In contrast to the connecting region 8 connecting the contact-making regions $\mathbf{7}_{11}$ and $\mathbf{7}_{12}$, respectively, and $\mathbf{7}_{21}$ and $\mathbf{7}_{22}$, respectively, there are increased mechanical and electrical requirements, in particular in the contact-making regions $\mathbf{7}_{11}$ and $\mathbf{7}_{12}$ of the high-frequency contact element 2 according to the invention at the first end $\mathbf{6}_1$ and in the contact-making regions $\mathbf{7}_{21}$ and $\mathbf{7}_{22}$ of the high-frequency contact element 2 according to the invention at the second end $\mathbf{6}_2$ of the longitudinal extent of the basic body part 1. For example, an additional gold layer in the two contact-making regions $\mathbf{7}_{11}$, $\mathbf{7}_{12}$, $\mathbf{7}_{21}$ and $\mathbf{7}_{22}$, respectively, advantageously has the effect of increased abrasion resistance and at the same time a lower contact resistance.

In the final, third manufacturing step, as shown in FIG. 1C, the electrically conductive coating 5, preferably the metallic coating 5, is removed in a region $\mathbf{9}_1$ and $\mathbf{9}_2$ surrounding the bushing 5 in each case at the first and second ends $\mathbf{6}_1$ and $\mathbf{6}_2$, respectively, of the high-frequency contact element 2 according to the invention. In this way, self-contained regions of the coating 5, which are each galvanically isolated from one another, form on the outer surface of the basic body part 1. These regions are firstly the region on the outer lateral surface of the basic body part 1 which forms the outer conductor of the high-frequency contact element 2 according to the invention and the regions in the individual bushings 5, which each form the individual inner conductors of the high-frequency contact element 2 according to the invention. By virtue of this manufacturing step, the original coating is divided into a coating $\mathbf{5}_1$ on the outer conductor side and a coating $\mathbf{5}_2$ on the inner conductor side. A contact-making region $\mathbf{7}_{11}$ on the outer conductor side and a contact-making region $\mathbf{7}_{12}$ on the outer conductor side are formed at the first end $\mathbf{6}_1$ of the high-frequency contact element 2. A contact-making region $\mathbf{7}_{21}$ on the outer conductor side and a contact-making region $\mathbf{7}_{22}$ on the outer conductor side are formed at the second end $\mathbf{6}_2$ of the high-frequency contact element 2.

In this way, a high-frequency contact element 2 according to the invention for contact-making and transmission of a high-frequency signal can be produced by means of three successive and typically automatable manufacturing steps without manufacturing individual parts in each case for the inner conductor element, the insulator element and the outer conductor element which are then comparatively complex to assemble.

A high-frequency contact element 2 according to the invention for contact-making and transmission of a differential high-frequency signal is shown in FIGS. 2A and 2B. For this purpose, it has two bushings $\mathbf{4}_1$ and $\mathbf{4}_2$, which each run from the first end $\mathbf{6}_1$ to the second end $\mathbf{6}_2$ in the longitudinal extent of the high-frequency contact element 2. The coatings $\mathbf{5}_2^{\ 1}$ and $\mathbf{5}_2^{\ 2}$, respectively, in the two bushings $\mathbf{4}_1$ and $\mathbf{4}_2$ are each used as inner conductor, while the coating $\mathbf{5}_1$ on the outer lateral surface forms the outer conductor. Instead of two bushings $\mathbf{4}_1$ and $\mathbf{4}_2$ for transmitting a differential signal, any desired and technically expedient number of bushing pairs can be provided which have an inner coating which in each case forms the inner conductor pairs for transmitting in each case one differential high-frequency signal. The individual pairs of bushings can be arranged within the basic body part 1 either in the form of a star with respect to one another or parallel to one another.

A further embodiment of a high-frequency contact element 2 according to the invention is shown in FIG. 3. In this case, the bushing 4 of the basic body part 1 is completely filled with coating material by means of selective coating. Alternatively, a coating within the bushing 4 can also be realized which has a greater layer thickness in comparison with the coating $\mathbf{5}_1$ on the outer conductor side and at the same time does not completely fill the bushing 4. Such a selective coating with an enlarged layer thickness in the inner conductor region is primarily advantageous during contact-making and transmission of high-frequency signals in a relatively high power range.

An increased layer thickness implemented by means of selective coating in a contact-making region $\mathbf{7}_{11}$, $\mathbf{7}_{12}$, $\mathbf{7}_{21}$, and $\mathbf{7}_{22}$ of the high-frequency contact element 2 according to the invention makes it possible to extend the usage time of the high-frequency contact element, which gets ever shorter owing to abrasion in the contact-making region.

Contact elements typically have an elastic response in the connecting region 8 in order firstly to realize in each case sufficient contact force in the contact-making region with the contact areas or contact terminals with which contact is to be made and secondly to compensate for manufacturing tolerances between the contact areas or contact terminals with which contact is to be made. In this case, the elasticity is preferably implemented over the entire longitudinal extent of the high-frequency contact element, i.e. over the entire connecting region 8 between the contact-making regions $\mathbf{7}_{11}$ and $\mathbf{7}_{12}$, respectively, and $\mathbf{7}_{21}$ and $\mathbf{7}_{22}$, respectively, of the high-frequency contact element according to the invention. Alternatively, only certain longitudinal sections of the high-frequency contact element can be configured to be elastic in each case, with inelastic longitudinal sections being provided between said longitudinal sections.

One embodiment of a longitudinal section of a high-frequency contact element according to the invention with elasticity in which, in particular, the transmission of a high-frequency signal is possible is shown in FIG. 4A. In this case, the high-frequency contact element is realized in the form of a torsion spring. The cross section of a high-frequency contact element in the form of a torsion spring makes it possible to realize concentricity between the coating $\mathbf{5}_1$ and $\mathbf{5}_2$ on the inner conductor side and on the outer conductor side over the entire longitudinal extent and therefore to realize an elastic high-frequency contact element for contact-making and transmission of a high-frequency signal.

In contrast to conventional chip-removal, non-cutting forming or primary forming manufacturing technologies, the additive manufacturing technology of producing, comparatively easily, a basic body part 1 with a longitudinal extent in the form of a torsion spring is preferably suitable. In this case, dimensions can also be realized for the high-frequency contact element in the form of a torsion spring which make it possible for there to be a spacing for adjacent high-frequency contact elements in the form of torsion springs, which is required when testing conductor tracks in semiconductor integration densities which can be realized nowadays and in the future.

A further suitable embodiment of a high-frequency contact element according to the invention with elasticity is a high-frequency contact element in the form of a spring arm as shown in FIG. 4B. In this embodiment too, there is a cross section of the high-frequency contact element which makes it possible to realize concentricity between the coating $\mathbf{5}_1$ and $\mathbf{5}_2$ on the inner conductor side and on the outer conductor side over the entire longitudinal extent. The spring arm preferably has, as illustrated in FIG. 4B, two turns or curvatures (S-shaped profile). This represents a realization involving minimized complexity of a spring arm between the contact-making regions $\mathbf{7}_{11}$ and $\mathbf{7}_{12}$ and $\mathbf{7}_{21}$ and $\mathbf{7}_{22}$, respectively, which are each arranged in two planes parallel to one another. In addition, however, a multiple number of turn or curvature pairs is also possible as long as they are technically expedient in the respective application case. Such a multiplication of the meandering form in the spring arm advantageously enables increased elasticity whilst at the same time reducing the lateral dimensions of the high-frequency contact element according to the invention.

While the outer diameter and inner diameter of the high-frequency contact element 2 at the first end $\mathbf{6}_1$ is reduced in comparison with the outer diameter and inner diameter of the connecting region 8 in the form of a spring arm of the high-frequency contact element 2, the outer diameter and inner diameter of the high-frequency contact element 2 at the second end $\mathbf{6}_2$ is enlarged with respect to the outer diameter and inner diameter of the connecting region 8 in the form of a spring arm. In this way, contact can be made between the contact-making regions $\mathbf{7}_{11}$ and $\mathbf{7}_{12}$ on the outer conductor side and on the inner conductor side at the first end $\mathbf{6}_1$ and contact areas or contact terminals on an integrated circuit to be tested which have comparatively small dimensions and/or have a comparatively small spacing with respect to one another. At the same time, contact can be made between the contact-making regions $\mathbf{7}_{21}$ and $\mathbf{7}_{22}$ on the outer conductor side and on the inner conductor side at the second end $\mathbf{6}_2$ and contact areas or contact terminals which, as an interface to a measuring instrument, typically are configured with a relatively large area and/or are arranged with a relatively large spacing with respect to one another. In order to realize a continuous and as far as possible constant characteristic of the impedance over the entire longitudinal extent of the high-frequency contact element, i.e. between the outer ends of the contact-making regions $\mathbf{7}_{11}$ and $\mathbf{7}_{12}$ and $\mathbf{7}_{21}$ and $\mathbf{7}_{22}$, respectively, and therefore transmission with minimized reflection, the jumps in diameter between the coating $\mathbf{5}_1$ and $\mathbf{5}_2$ on the outer conductor side and on the inner conductor side are in the same ratio in the region of the first and second ends $\mathbf{6}_1$ and $\mathbf{6}_2$. In order to implement this aim, in addition the jump in diameter on the inner conductor side is in each case realized so as to be offset with respect to the jump in diameter on the outer conductor side in the region of the first and second ends $\mathbf{6}_1$ and $\mathbf{6}_2$ (so-called low-pass-compensated reflection-minimized transition).

A further variant of a high-frequency contact element according to the invention with elasticity consists in the basic body part 1 being produced from an elastic dielectric material. An elastomer, for example silicone or natural rubber, which can likewise be constructed by means of additive manufacturing technology to give a geometry which is formed with any desired complexity is suitable for this purpose. Since the layer thickness of the metallic coating $\mathbf{5}_1$ and $\mathbf{5}_2$ of the dielectric basic body part 1 is comparatively very small in relation to the dimensions of the dielectric basic body part 1, the metallic coating $\mathbf{5}_1$ and $\mathbf{5}_2$ deforms together with the elastic dielectric basic body part 1 in the event of the occurrence of certain compressive or tensile forces on the high-frequency contact element 2 according to the invention.

When realizing the contact-making regions $\mathbf{7}_{11}$, $\mathbf{7}_{12}$, $\mathbf{7}_{21}$ and $\mathbf{7}_{22}$ on the inner conductor side and on the outer conductor side of the high-frequency contact element 2 according to the invention, a single-part or multi-part technical solution can be implemented. In the case of the single-part technical solution, the contact-making regions $\mathbf{7}_{11}$, $\mathbf{7}_{12}$, $\mathbf{7}_{21}$ and $\mathbf{7}_{22}$ on the inner conductor side and on the outer conductor side are realized integrally with the connecting region 8 within a single basic body part 1. In the case of the multi-part technical solution, separate component parts for contact-making are produced using a conventional or additive manufacturing technology and then connected to the single basic body part containing the connecting region 8 jointly in the additive manufacturing process and assembled to form the complete basic body part 1. Alternatively, the component parts for contact-making can also be connected to the single basic body part containing the connecting region 8 by means of conventional connection technology, for example by means of soldering, even after the additive assembly and coating process of the basic body part 1.

FIG. 5A shows an exemplary embodiment of a single-part realization of the contact-making regions with the connecting region 8 of the high-frequency contact element 2 according to the invention. In this case, in each case one end-face contact with the contact area or contact terminal with which contact is to be made is realized both on the inner conductor side and on the outer conductor side. For this purpose, the first end $\mathbf{6}_1$ of the high-frequency contact element 2 according to the invention has an end face, which is oriented in such a way that, in the contact-making state, it is aligned parallel or approximately parallel to the contact areas with which contact is to be made. In this way, sufficient electrical contact with a good contact resistance between the contact-making region $\mathbf{7}_{11}$ and $\mathbf{7}_{12}$ on the outer conductor side and on the inner conductor side at the first end $\mathbf{6}_1$ of the high-frequency contact element 2 according to the invention and the contact areas on the inner conductor side and on the outer conductor side with which contact is to be made on a printed circuit board, an IC housing or an IC substrate is possible.

For this purpose, a coating $\mathbf{5}_1$ and $\mathbf{5}_2$ on the outer conductor side and on the inner conductor side, respectively, is provided on the end face in the contact-making region $\mathbf{7}_{11}$ and $\mathbf{7}_{12}$ on the outer conductor side and on the inner conductor side. The lateral dimensions of the coating $\mathbf{5}_1$ and $\mathbf{5}_2$ on the inner conductor side and on the outer conductor side are in this case such that there is in each case a sufficient touching-contact area with the respective contact areas with which contact is to be made and therefore good contact resistance. In order to enable this in the case of very miniaturized contact elements in accordance with the invention with a comparatively minimal outer diameter of the high-frequency contact element according to the invention, the outer diameter of the basic body part 1 and therefore the outer diameter of the high-frequency contact element 2 according to the invention is enlarged in the contact-making region $\mathbf{7}_{11}$ on the outer conductor side. In order not to disadvantageously increase the impedance of the high-frequency contact element 2 according to the invention at the first end $\mathbf{6}_1$ owing to this technical measure, the absolute permittivity at the first end $\mathbf{6}_1$ is reduced to the same extent. For this purpose, not only is the coating 5 removed in the end-side region between the coating $\mathbf{5}_1$ and $\mathbf{5}_2$ on the inner conductor side and on the outer conductor side, but also a sufficient region 10 of the dielectric basic body part 1 therebeneath is removed.

A multi-part technical solution for the contact-making regions on the inner conductor side and on the outer conductor side of a high-frequency contact element 2 according to the invention is illustrated in FIG. 5B. In this case, the enlargement of the touching-contact area in the contact-making regions $\mathbf{7}_{11}$ and $\mathbf{7}_{12}$ on the inner conductor side and on the outer conductor side and the contact areas or contact terminals with which contact is to be made in each case is realized by virtue of the fact that in each case one contact crown $\mathbf{11}_1$ and $\mathbf{11}_2$, respectively, is positioned on the coated basic body part 1 in the region of the contact-making regions $\mathbf{7}_{11}$ and $\mathbf{7}_{12}$ on the inner conductor side and on the outer conductor side. This contact crown $\mathbf{11}_1$ or $\mathbf{11}_2$ is in each case produced from a metal with good electrical conductivity and is preferably connected to the coating $\mathbf{5}_1$ and $\mathbf{5}_2$ on the inner conductor side and on the outer conductor side, respectively, by means of soldering.

A further variant of a multi-part technical solution for the contact-making regions on the inner conductor side and on the outer conductor side of a high-frequency contact element 2 according to the invention is shown in FIG. 5C. In this case, in each case contact tips $\mathbf{12}_1$, $\mathbf{12}_2$, $\mathbf{12}_3$ are used as component parts for contact-making. The individual contact tips $\mathbf{12}_1$, $\mathbf{12}_2$, $\mathbf{12}_3$ are each produced from a metal with good electrical conductivity and each have a shaft, with which they are inserted into an associated bore in the high-frequency contact element 2 according to the invention. In order to make contact with the inner conductor, preferably a single contact tip $\mathbf{12}_1$ is inserted with its shaft into the bushing 4 of the coated basic body part 1 and soldered to the coating on the inner conductor side. In order to make contact with the outer conductor, preferably a plurality of contact tips $\mathbf{12}_2$, $\mathbf{12}_3$ are provided, which are each inserted with their shaft into a bore arranged in the region of the coating $\mathbf{5}_2$ on the outer conductor side. The contact tips $\mathbf{12}_2$, $\mathbf{12}_3$ are in this case preferably arranged in equidistant angular sections on a circle around the longitudinal axis 3 of the high-frequency contact element 2 according to the invention.

FIG. 5D shows a further variant of a multi-part technical solution for the contact-making regions on the inner conductor side and on the outer conductor side of a high-frequency contact element 2 according to the invention. The component parts for contact-making are in this case each design to be elastic. These elastic component parts for contact-making $\mathbf{13}_1$, $\mathbf{13}_2$, $\mathbf{13}_3$ can be realized in the connecting region 8 as an alternative to or in addition to the above-illustrated elasticity. The elastic component parts for contact-making $\mathbf{13}_1$, $\mathbf{13}_2$, $\mathbf{13}_3$ are in this case component parts in the form of spring arms, which, in addition, are designed to be hollow along the spring arm so as to the increase elasticity. The elastic component parts for contact-making $\mathbf{13}_1$, $\mathbf{13}_2$, $\mathbf{13}_3$ likewise have a shaft, with which they are inserted into a bore at the first end $\mathbf{6}_1$. The individual elastic component parts for contact-making $\mathbf{13}_1$, $\mathbf{13}_2$, $\mathbf{13}_3$ are arranged on the inner conductor side and on the outer conductor side in each case, preferably in a similar way to the arrangement of the contact tips in FIG. 5C.

Owing to the technical possibility of the additive manufacturing technology of producing even very complicated geometric forms, the complicated geometries in the contact-making shown in FIGS. 5C and 5D, namely the contact tips and the contact element in the form of a spring arm, can also be produced in a single part in combination with the connecting region 8 as a single-part dielectric basic body part 1 in an additive manufacturing process and by subsequent metallic coating. This embodiment is restricted to the contact-making on the outer conductor side. Alternatively, the individual geometries of a component part for contact-making can be produced in each case separately as dielectric basic body parts in an additive manufacturing process and then assembled in combination with the dielectric basic body part 1, which includes the connecting region 8, in a continued additive manufacturing process to form a single-part and complete basic body part 1. Then, the metallic coating of this single-part and complete basic body part 1 takes place.

Of course, the contact-making regions $\mathbf{7}_{21}$ and $\mathbf{7}_{22}$ on the outer conductor side and on the inner conductor side at the second end $\mathbf{6}_2$ of the high-frequency contact element 2 according to the invention can be embodied in an equivalent manner to the embodiments for contact-making illustrated in each case in FIGS. 5A to 5D for the first end $\mathbf{6}_1$.

In addition to these contact-making geometries respectively illustrated in the previous figures, yet further forms of contact-making are also conceivable and included in the invention.

A special variant of contact-making between the high-frequency contact element 2 according to the invention and the contact areas or contact terminals with which contact is to be made is shown in FIGS. 5E and 5F:

In this case, contact is made primarily in the radial direction between the contact-making region $\mathbf{7}_{12}$ on the inner conductor side of the high-frequency contact element 2 according to the invention and a solder ball $\mathbf{14}_1$ and between the contact-making region $\mathbf{7}_{11}$ on the outer conductor side of the high-frequency contact element 2 according to the invention and preferably a plurality of solder balls $\mathbf{14}_2$ and $\mathbf{14}_3$. The solder balls $\mathbf{14}_1$, $\mathbf{14}_2$ and $\mathbf{14}_3$ are soldered to a printed circuit board 15 and connected to associated conductor tracks. As an alternative to the printed circuit board 15, contact can also be made with a housing of an integrated circuit or directly with a substrate. The solder balls $\mathbf{14}_2$ and $\mathbf{14}_3$ which are in electrical contact with the contact-making region on the outer conductor side are preferably arranged, as shown in FIG. 5F, on a circle which is located coaxially with respect to the solder ball $\mathbf{14}_1$, which makes contact with the contact-making region $\mathbf{7}_{12}$ on the inner conductor side of the high-frequency contact element 2 according to the invention. The spacing between the inner solder balls $\mathbf{14}_1$ and the outer solder balls $\mathbf{14}_2$, $\mathbf{14}_3$, $\mathbf{14}_4$, $\mathbf{14}_5$ $\mathbf{14}_6$ and $\mathbf{14}_7$ needs to be matched to the diameter of the coated dielectric basic body part 1 in the contact-making region $\mathbf{7}_{12}$ and $\mathbf{7}_{11}$ on the inner conductor side and on the outer conductor side, respectively.

For improved electrical contact-making between the solder balls $\mathbf{14}_1$, $\mathbf{14}_2$ and $\mathbf{14}_3$ and the contact-making regions $7_{11}$ and $7_{12}$ on the outer conductor side and on the inner conductor side, respectively, of the high-frequency contact element 2 according to the invention, the contact-making regions $7_{11}$ and $7_{12}$ on the outer conductor side and on the inner conductor side, respectively, of the high-frequency contact element 2 according to the invention have in each case one bevel in the transition region between the bushing 4 and the end face and, respectively, between the outer lateral surface and the end face. Instead of a bevel, in each case one step can be provided in the contact-making region $7_{11}$ and $7_{12}$ on the outer conductor side and inner conductor side, respectively, of the high-frequency contact element 2 according to the invention. In this case, the contact-making has not only a radially directed component, but also an axially directed component.

Since, in the meantime, extremely small solder balls can be placed with an extremely small spacing with respect to one another on a printed circuit board, an IC housing or an IC substrate, this contact-making technique is also suitable for extremely miniaturized high-frequency contact elements according to the invention which can be manufactured with very small dimensions by means of additive manufacturing process technology.

Instead of solder balls with in each case a spherical contact area, alternatively other rotationally symmetrical contact bodies can also be used. Preferably suitable are contact bodies which have a conically formed contact area, for example conical contact bodies or contact bodies in the form of truncated cones. In the case of high-frequency contact elements according to the invention with elasticity, cylindrical contact bodies are also conceivable.

Alternatively, the solder balls, even as component parts for contact-making based on the variants in FIGS. 5B, 5C and 5D, can belong to the high-frequency contact element 2 according to the invention and can be connected to the coated dielectric basic body part 1 of the high-frequency contact element 2 according to the invention. In this case, the solder balls make contact with correspondingly curved, i.e. concavely formed, contact areas in a printed circuit board, in an IC housing or directly in an IC substrate.

At this point, it will be mentioned that in each case magnets with a specific polarity can be inserted into the basic body part 1 adjacent to the contact-making regions $7_{11}$, $7_{12}$, $7_{21}$ and $7_{22}$. These magnets can interact with magnetic or magnetizable regions which are arranged in the contact areas or contact terminals with which contact is to be made or adjacent to the contact areas or contact terminals with which contact is to be made and enable improved contact-making.

The individual embodiments for impedance matching within the high-frequency contact element according to the invention between the contact areas or contact terminals with which contact is to be made in each case will be set forth below with reference to FIGS. 6A to 6H:

Typically, the input impedances of the contact areas with which contact is to be made each have identical, standardized values, for example 50Ω. If the contact areas on the inner conductor side and on the outer conductor side with which contact is to be made in each case by the contact-making regions $7_{11}$ and $7_{12}$, respectively, and $7_{21}$ and $7_{22}$, respectively, at the first and second ends $6_1$ and $6_2$ of the high-frequency contact element 2 according to the invention each have different diameters, with a view to impedance matching and at the same time geometric matching, the associated contact-making regions $7_{11}$ and $7_{12}$, respectively, and $7_{21}$ and $7_{22}$, respectively, at the first and second ends $6_1$ and $6_2$ need to be matched to the impedance and geometry ratios of the contact areas with which contact is to be made. At the same time, whilst maintaining a constant impedance, as continuous a transition as possible needs to be implemented between the different geometry ratios, i.e. between the different diameter ratios, of the contact-making regions $7_{11}$ and $7_{12}$, respectively, and $7_{21}$ and $7_{22}$, respectively, at the first and second ends $6_1$ and $6_2$ of the high-frequency contact element 2 according to the invention.

If the contact areas with which contact is to be made in each case by means of the contact-making regions $7_{11}$ and $7_{12}$, respectively, and $7_{21}$ and $7_{22}$, respectively, at the first and second ends $6_1$ and $6_2$ are in each case symmetrical with respect to the longitudinal axis 3 of the high-frequency contact element 2 according to the invention, the coated basic body part 1 of the high-frequency contact element 2 according to the invention takes on the form of a truncated cone, as shown in FIG. 6A. The outer diameter of the high-frequency contact element 2 changes between the first and second ends $6_1$ and $6_2$ with the same ratio as the inner diameter.

If the contact areas with which contact is to be made in each case by means of the contact-making regions $7_{11}$ and $7_{12}$, respectively, and $7_{21}$ and $7_{22}$, respectively, at the first and second ends $6_1$ and $6_2$ are each asymmetrically offset with respect to one another and the high-frequency contact element 2' according to the invention is realized elastically as a spring arm, a geometric form of the high-frequency contact element 2' results, as shown in FIG. 6B. The ratio between the outer diameter and the inner diameter of the high-frequency contact element 2 and therefore the impedance of the high-frequency contact element 2 is continuously constant along the longitudinal extent of the high-frequency contact element 2' according to the invention.

If the particular case is present whereby the input impedances of the contact areas with which contact is to be made in each case by means of the contact-making regions $7_{11}$ and $7_{12}$, respectively, and $7_{21}$ and $7_{22}$, respectively, at the first and second ends $6_1$ and $6_2$ are each different, the impedance in the contact-making regions $7_{11}$ and $7_{12}$, respectively, and $7_{21}$ and $7_{22}$, respectively, needs to be matched to the impedance in the associated contact areas with each contact is to be made and, at the same time, an as far as possible continuous impedance transition between the first and second ends $6_1$ and $6_2$ in the connecting region 8 of the high-frequency contact element 2 according to the invention needs to be created. Such impedance tapering can be realized, for example, with a jump in the diameter on the inner conductor side and on the outer conductor side or a plurality of jumps in diameter on the inner conductor side and on the outer conductor side, as are illustrated in the contact-making regions $7_{11}$ and $7_{12}$, respectively, and $7_{21}$ and $7_{22}$, respectively, in FIG. 4B.

A further variant of impedance-matched transmission within the high-frequency contact element according to the invention between contact areas with which contact is to be made in each case by the contact-making regions $7_{11}$ and $7_{12}$, respectively, and $7_{21}$ and $7_{22}$, respectively, with in each case an identical input impedance is illustrated in FIG. 6C:

While in the case of this high-frequency contact element 2 according to the invention, the inner diameter remains constant over the entire longitudinal extent of the contact element, the outer diameter increases in size from the first end $6_1$ to the second end $6_2$ over several steps.

In order to keep the impedance of the high-frequency contact element 2 according to the invention constant over its entire longitudinal extent, the dielectric basic body part 1 is constructed by means of a plurality of layers $16_1$, $16_2$, $16_3$ and $16_4$ consisting of a dielectric material which are stacked in the longitudinal direction and each have a different relative permittivity. The relative permittivity of the individual dielectric layers $16_1$, $16_2$, $16_3$ and $16_4$ in this case decreases from the first end $6_1$ to the second end $6_2$ of the high-frequency contact element 2 according to the invention with a view to achieving a constant impedance.

In general, the relative permittivity of the individual dielectric layers within the dielectric basic body part 1 changes with indirect proportionality with respect to the change in the ratio between the outer and inner diameters in the individual layers. Therefore, in the case of an outer diameter which is constant over the longitudinal extent and an inner diameter which varies over the longitudinal extent, the relative permittivity of the individual dielectric layers can be matched equivalently with a view to achieving a constant impedance.

The number of stepped jumps in outer and/or inner diameter and, associated with this, the number of dielectric layers with in each case different relative permittivity is based on the technical possibility of finding and using dielectric materials with in each case differently stepped relative permittivity for the additive manufacturing process.

A further technical variant of impedance matching along the longitudinal extent of the high-frequency contact element 2 according to the invention is based on the modification of the absolute permittivity of the dielectric basic body part 1 along its longitudinal extent. In the simplest case, for this purpose cavities 17 are provided within the dielectric basic body part 1, as shown in FIG. 6D, said cavities being surrounded completely by the dielectric material of the basic body part 1 and preferably being filled with air. Since the relative permittivity of air is one and is therefore less than the relative permittivity of any other dielectric material used in the basic body part 1, the absolute permittivity in the longitudinal sections of the basic body part 1 with cavities 17 is reduced in comparison with the longitudinal sections of the basic body part 1 without cavities 16.

While, in FIG. 6D, the number, the arrangement and the geometric form and dimensions of the individual cavities 17 are only illustrated schematically, in a real high-frequency contact element 2 according to the invention a stepped or ideally a continuous change in the absolute permittivity along the longitudinal extent of the high-frequency contact element 2 according to the invention can be achieved by suitable arrangement and form of the individual cavities 17 within the dielectric basic body part 1. In this way, in the case of a multiply stepped or continuous change in the outer and inner diameters as a result of an oppositely multiply stepped or continuous change in the absolute permittivity, a constant impedance can be achieved along the longitudinal extent of the high-frequency contact element 2 according to the invention.

Instead of the preferred filling of the individual cavities 17 with air, filling with another gaseous substance, a liquid substance or a solid dielectric material can also take place. With all of these technical measures, the absolute permittivity of the high-frequency contact element 2 according to the invention along its longitudinal extent can be influenced in a targeted manner.

Instead of cavities 17 which are completely enclosed by a dielectric material, as shown in FIG. 6D, it is also possible for slots 28 to be realized in the dielectric basic body part 1 by means of an additive manufacturing process, said slots running over the entire radial extent of the basic body part 1, as shown in FIGS. 6E to 6G. The absolute permittivity along the longitudinal extent of the high-frequency contact element 2 according to the invention can also be influenced in a targeted manner by a suitable number, arrangement and geometric form of such slots 28 and can be used for impedance matching along the longitudinal extent of the high-frequency contact element 2.

If these slots 28 each extend parallel to one another in the longitudinal direction of the high-frequency contact element 2 according to the invention, additionally also the elasticity of the high-frequency contact element 2 according to the invention can be influenced in a targeted manner by virtue of these slots 28. Owing to the provision of parallel slots in the direction of longitudinal extent, the high-frequency contact element 2 according to the invention can therefore expand in the radial direction comparatively easily in the case of compression in the direction of the longitudinal axis.

In order to transmit a high-frequency signal via a high-frequency contact element with such slots, the slot width of the individual slots needs to be designed to be smaller, preferably markedly smaller, than the wavelength of the high-frequency signal to be transmitted.

In order to realize such slots 28, in each case layers consisting of a dielectric material need to be constructed in the additive manufacturing process in these slots 28, in contrast to the remaining basic body part 1, said layers preventing metallization of the side walls of the slots 28 during metallic coating of the basic body part 1 and being removable again after the coating process. Photoresist which can likewise be constructed selectively within the basic body part 1 using additive manufacturing technology can be used as the dielectric material for such sacrificial layers, for example. In order to remove these sacrificial layers again after metallization of the basic body part 1 by means of a suitable solvent, for example by means of acetone, the coating $5_1$ on the outer conductor side needs to be removed in the region of the slot-shaped cavities 17'. In order to identify these slots 28 with respect to the remaining regions of the dielectric basic body part 1, the outer surface of the individual slots 28 needs to be curved, for example, i.e. concavely or convexly. The metallic layer on the individual slots 28 is therefore easily identifiable for an optical device, for example a laser device, which removes the metallic coating in these regions. Once the dielectric sacrificial layers within the individual slots 28 have been removed, the associated coating $5_2$ on the inner conductor side needs to be removed in the region of the slots 28, for example by means of an optical method.

The individual cavities 17 and slots 28 in accordance with the fourth and fifth embodiments of the invention can also be arranged and formed in such a way that a continuous stepped transition between two different impedances at the first and second ends $6_1$ and $6_2$ can be realized.

FIG. 7 shows a particular embodiment of a high-frequency contact element 2 according to the invention, in which a high-frequency contact element 2 is mounted elastically by an additional elastic element 18. The additional elastic element 18 is fastened between the high-frequency contact element 2 according to the invention and a connecting part 20, which will be explained further below. Alternatively, the additional elastic element 18 can also be connected to a printed circuit board 15, with which contact is to be made by means of the high-frequency contact element 2 according to the invention.

The elastic element 18 may preferably be a torsion spring, as is illustrated in FIG. 7. In addition, other elastic elements, for example a plate spring, a bending spring or a spring arm, are also possible. While the elasticity is implemented by the geometric form of the elastic element in the case of all of these elastic elements, alternatively an element with a comparatively simple form, for example a cylindrical element, consisting of an elastic material, for example of an elastomer, can also be used.

The connecting part 20 may be a connecting plate, which is connected to the high-frequency contact element 2 according to the invention directly or with a component for contact-making interposed. Alternatively, the elastic element 18 may also be a printed circuit board 15, with which contact is made by means of the high-frequency contact element according to the invention.

Different variants of a high-frequency contact element arrangement 19 according to the invention will be set forth below with reference to FIGS. 8A to 8F, which each contain at least one high-frequency contact element 2 according to the invention:

The high-frequency contact element arrangement 19 according to the invention may firstly be an arrangement of high-frequency contact elements 2 according to the invention connected to one another, which are only connected to one another jointly in the manufacturing process, preferably in the additive manufacturing process, and then separated for the technical application. In addition, the high-frequency contact element arrangement 19 according to the invention can secondly contain a plurality of high-frequency contact elements 2 according to the invention which are connected to one another permanently in the technical application. In the second case, the arrangement may be an interposer arrangement, for example, in which a plurality of high-frequency contact elements 2 according to the invention connected to one another in parallel make contact with in each case mutually parallel contact areas or contact terminals on a printed circuit board, on an IC housing or directly on an IC substrate. Finally, in the second case, the individual high-frequency contact elements 2 according to the invention, which are connected to one another in each case in parallel, are formed in such a way that their longitudinal extent also has a transverse component. With such high-frequency contact elements running at an angle, for example, as is illustrated in FIG. 7, for example, it is also possible to transfer between contact areas with which contact is to be made having a first grid spacing and contact areas with which contact is to be made having a second grid spacing, which is different than the first grid spacing. In this application case, the high-frequency contact element arrangement according to the invention acts as a space translator assembly.

In a first variant as shown in FIG. 8A, in each case on the upper side of a connecting part 20 in the form of a connecting plate 20, a plurality of high-frequency contact elements 2 according to the invention are each connected to associated contact areas on the inner conductor side and on the outer conductor side on the upper side of the connecting plate 20 via contact component parts 21 on the inner conductor side and on the outer conductor side. Similarly, a plurality of high-frequency contact elements 2 according to the invention on the lower side of the connecting plate 20 are each connected to associated contact areas on the inner conductor side and on the outer conductor side on the lower side of the connecting plate 20 via contact component parts 21 on the inner conductor side and on the outer conductor side.

The connecting plate 20 is in this case produced from an electrically nonconductive, i.e. dielectric, material. The contact component parts 21 are produced from an electrically conductive material.

In this case, the connecting plate 20 can be produced in a separate conventional or additive manufacturing process. The individual high-frequency contact elements 2 according to the invention can be arranged on the upper and lower sides of the connecting plate in each case in a row with a specific constant spacing or with a different spacing. Alternatively, an arrangement in a three-dimensional grid with a preferably constant or else with a variable grid spacing with respect to one another is also possible. In the case of a connection of the individual high-frequency contact elements 2 according to the invention which is restricted singularly to the manufacture, an arrangement of the high-frequency contact elements with a three-dimensional grid having a plurality of parallel connecting plates and individual connecting webs which each connect the parallel connecting plates is also possible.

A bore 22 with an electrically conductive coating realizes in each case a connection on the inner conductor side between a contact component part 21 on the inner conductor side on the upper side and on the lower side of the connecting plate 20 and therefore between a high-frequency contact element 2 according to the invention on the upper side and the lower side of the connecting plate 20. The contact component parts 21 on the outer conductor side each realize a connection on the outer conductor side between the individual high-frequency contact elements 2 according to the invention and a contact terminal of a common ground on the lower side or upper side of the connecting plate 19.

The individual high-frequency contact elements 2 according to the invention are each connected on the inner conductor side and on the outer conductor side to the associated contact component parts 21 on the inner conductor side and on the outer conductor side, respectively, preferably by means of soldering, which contact component parts are in turn connected to the electrically conductive inner coating of the associated bore 22 or to the associated contact terminal of the common ground of the connecting plate 20, preferably by means of soldering. The contact-making regions on the inner conductor side and on the outer conductor side of the individual high-frequency contact elements 2 according to the invention can alternatively be connected directly to the electrically conductive inner coating of the associated bore 22 or to the associated contact terminal of the common ground of the connecting plate 20 without contact component parts 21 on the inner conductor side and on the outer conductor side interposed.

The configuration of the individual high-frequency contact element 2 according to the invention connected to the connecting plate 20 does not necessarily need to be hollow-cylindrical, as is illustrated in FIG. 8A, but can assume any of the above-illustrated embodiments. It is also not necessary for all of the high-frequency contact elements 2 according to the invention within the high-frequency contact element arrangement according to the invention to have the same embodiment. For example, the high-frequency contact elements on the lower side of the connecting plate 20 can each be inelastic high-frequency contact elements having a hollow-cylindrical form, while the high-frequency contact elements on the upper side of the connecting plate 20 can each be embodied as elastic high-frequency contact elements formed as a spring arm. In this way, firstly elastic contact-making of the contact areas with which contact is to be made above the connecting plate 20 and secondly a translation of the grid spacing between the contact areas with which contact is to be made above the connecting plate 20 and the contact areas with which contact is to be made below the connecting plate 20 can be realized.

FIG. 8B shows a further variant of a high-frequency contact element arrangement 19' according to the invention, in which the individual high-frequency contact elements 2' according to the invention are produced together with the connecting plate 20' in a common additive manufacturing process. In this case, there are no separate high-frequency contact elements resting on the upper side and lower side of the connecting plate 20', but now only a single high-frequency contact element 2' according to the invention per grid point. The connecting plate 20' now only connects the high-frequency contact elements 2' which are each arranged at each grid point to one another. The coating $\mathbf{5}_2$ on the inner conductor side of the individual high-frequency contact element 2' according to the invention therefore extends from the contact-making region $\mathbf{7}_{12}$ on the inner conductor side above the connecting plate 20' via an inner bore in the connecting plate 20' as far as the contact-making region $\mathbf{7}_{22}$ on the inner conductor side below the connecting plate 20'.

The coating $\mathbf{5}_1$ on the outer conductor side of the individual high-frequency contact element 2' according to the invention extends in each case between the contact-making regions $\mathbf{7}_{11}$ on the outer conductor side which are located in each case above the connecting plate 20' of all of the high-frequency contact elements 2' and the upper side, acting as common ground, of the connecting plate 20' and between the contact-making regions $\mathbf{7}_{21}$ on the outer conductor side which are located in each case below the connecting plate 20' of all of the high-frequency contact elements 2' and the lower side, acting as common ground, of the connecting plate 20'.

In the second variant of the high-frequency contact element arrangement 19' according to the invention shown in FIG. 8B, similarly to the first variant shown in FIG. 8A, all of the embodiments already explained above of a high-frequency contact element according to the invention can be used for the individual high-frequency contact elements 2' according to the invention on the upper side and lower side of the connecting plate 20'. A different form of the individual high-frequency contact elements 2' according to the invention in each case on the upper side and lower side of the connecting plate 20' is also possible.

The position of the connecting plate 20' along the longitudinal extent of the individual high-frequency contact element 2' does not necessarily need to be central with respect to the longitudinal extent, but can also be in any other position between the first and second ends $\mathbf{6}_1$ and $\mathbf{6}_2$ of the high-frequency contact elements 2'. Instead of a single connecting plate 20', for increased mechanical stabilization of the individual high-frequency contact elements 2' according to the invention it is also possible to use a plurality of connecting plates 20' which are spaced apart from one another in a suitable manner.

FIG. 8C shows an arrangement of a plurality of high-frequency contact elements 2 according to the invention arranged in each case in a two-dimensional grid between two printed circuit boards $\mathbf{15}_1$ and $\mathbf{15}_2$, IC housings $\mathbf{15}_1$ and $\mathbf{15}_2$ or IC substrates $\mathbf{15}_1$ and $\mathbf{15}_2$ with which contact is to be made. The high-frequency contact elements 2 according to the invention each have an elasticity owing to their form in the shape of a torsion spring present in the central region of the longitudinal extent. The arrangement of parallel contact elements 2 is realized without a connecting plate 20 or without connecting webs 20 in the variant in FIG. 8C in order to also enable limited bending of the individual elastic high-frequency contact element 2 in the transverse direction in the case of a compression of the individual elastic high-frequency contact elements 2 to a greater extent in addition to the compression of the individual contact elements 2 in the longitudinal direction.

FIG. 8D shows a high-frequency contact element arrangement, in which a plurality of high-frequency contact elements 2 according to the invention, which are each arranged in a two-dimensional grid, are located between two printed circuit boards $\mathbf{15}_1$ and $\mathbf{15}_2$, IC housings $\mathbf{15}_1$ and $\mathbf{15}_2$ or IC substrates $\mathbf{15}_1$ and $\mathbf{15}_2$ with which contact is to be made. The individual high-frequency contact elements 2 according to the invention are firstly angled in each case, preferably with a double angle, and secondly are each embodied in stepped fashion with respect to their outer diameter. It is thus possible to make electrical contact with individual contact areas, arranged in a comparatively tight grid, on a printed circuit board $\mathbf{15}_1$, an IC housing $\mathbf{15}_1$ or an IC substrate $\mathbf{15}_1$ by means of the high-frequency contact element arrangement 19 according to the invention and to connect said contact areas to associated contact areas, arranged with a larger grid, on a printed circuit board $\mathbf{15}_2$, an IC housing $\mathbf{15}_2$ or an IC substrate $\mathbf{15}_2$. Therefore, a so-called high-frequency space translator assembly is provided, with which it is possible for parallel contact to be made with a plurality of contact areas, a translation from a finer grid spacing to a coarser grid spacing can be realized, and the impedance over the entire longitudinal extent of all of the high-frequency contact elements 2 is kept constant. The coarser grid spacing makes it possible to use a simpler and therefore more cost-effective production technology on the printed circuit board $\mathbf{15}_2$, on the IC housing $\mathbf{15}_2$ or on the IC substrate $\mathbf{15}_2$. In addition, therefore, a connection to high-frequency cables, lines and plugs, which typically have larger dimensions, can be implemented.

FIG. 8E shows a detail of a high-frequency contact element arrangement 19 according to the invention, in which the high-frequency contact element 2 is connected to a connecting plate 20 connecting the individual high-frequency contact element 2, said connecting plate in each case being in the form of an electrical circuit carrier. The electrical signal lines 23 can in this case be fitted to the upper side 24 and/or to the lower side 25 of the connecting plate 20.

These electrical signal lines 23 connect the individual high-frequency contact elements 2 according to the invention which are located above and/or below the connecting plate 20 acting as electrical circuit carrier to associated active or passive electronic components on the upper side 24 or lower side 25 of the connecting plate 20. For example, the high-frequency signals, with which contact has been made and which are transmitted in each case by the high-frequency contact element 2 according to the invention can be routed over these electrical signal lines 23, which are preferably realized as striplines which are optimized in terms of high frequencies, to a common high-frequency plug, which is positioned at a suitable point on the connecting plate 20.

The coating $\mathbf{5}_1$ on the outer conductor side of the individual high-frequency contact element 2 according to the invention is in this case connected in each case directly to an associated signal line 23 constructed on the upper side 24 and/or on the lower side 25, said signal line representing the grounding line of a stripline. The coating $\mathbf{5}_2$ on the inner conductor side of the individual high-frequency contact elements 2 according to the invention is in this case connected in each case to an electrical signal line 23 fitted on the upper side 24 and/or on the lower side 25 via an electrical signal line 26 running within the connecting plate 20.

The electrical signal line 26, which typically runs parallel to the upper or lower side 24 or 25 and within the connecting plate 20, is connected directly to the coating $\mathbf{5}_2$ on the inner conductor side of the high-frequency contact element 2 in the case of a high-frequency contact element arrangement 19' according to the invention realized in a single part as shown in FIG. 8B. In the case of a multi-part realization of the high-frequency contact element arrangement 19 according to the invention as shown in FIG. 8A, the electrical signal line 26 running within the connecting plate 20 is connected to the electrical coating of a bore 22, which runs aligned with the bushing 4 of the high-frequency contact element 2, within the connecting plate 20. The electrically conductive coating of the bore 22 within the connecting plate 20 in this case makes contact with the coating $\mathbf{5}_2$ on the inner conductor side of the high-frequency contact element 2.

The electrical connection between the electrical signal line 26, which runs within the connecting plate 20, and the electrical signal line 23, which runs on the upper or lower side 24 or 25 of the connecting plate 20, is provided via an electrically conductive coating of a bore 22', which is applied with an electrical signal line 23 to the upper or lower side 24 or 25 of the connecting plate 20. This electrical signal line 23 represents the inner conductor of a stripline.

Finally, FIG. 8F shows a high-frequency contact element arrangement 19 according to the invention which, only in the production process, holds together the individual high-frequency contact elements 2 according to the invention with a specific grid and acts as supporting geometry. Prior to use, the individual high-frequency contact elements 2 according to the invention within the high-frequency contact element arrangement 19 are separated from one another. For easier separation of the individual high-frequency contact elements, in each case one desired breaking point 27 is provided in the connecting plate 20, which can also comprise individual connecting webs 20 between the individual high-frequency contact elements 2 according to the invention.

Although the present invention has been described above completely with reference to preferred exemplary embodiments, it is not restricted to these exemplary embodiments, but can be modified in a variety of ways.

LIST OF REFERENCE SYMBOLS

1 basic body part
2 high-frequency contact element
3 longitudinal axis
4, $\mathbf{4}_1$, $\mathbf{4}_2$ bushing
5, $\mathbf{5}_1$, $\mathbf{5}_2$, $\mathbf{5}_2^1$, $\mathbf{5}_2^2$ coating
$\mathbf{6}_1$, $\mathbf{6}_2$ first and second ends
$\mathbf{7}_{11}$, $\mathbf{7}_{12}$, $\mathbf{7}_{21}$, $\mathbf{7}_{22}$ contact-making region
8 connecting region
$\mathbf{9}_1$, $\mathbf{9}_2$ region without coating
10 region
$\mathbf{11}_1$, $\mathbf{11}_2$ contact crown
$\mathbf{12}_1$, $\mathbf{12}_2$, $\mathbf{12}_3$ contact tip
$\mathbf{13}_1$, $\mathbf{13}_2$, $\mathbf{13}_3$ elastic component part for contact-making
$\mathbf{14}_1$, $\mathbf{14}_2$, $\mathbf{14}_3$, $\mathbf{14}_4$, $\mathbf{14}_5$, $\mathbf{14}_6$ solder ball
15, $\mathbf{15}_1$, $\mathbf{15}_2$ printed circuit board or IC housing or IC substrate
$\mathbf{16}_1$, $\mathbf{16}_2$, $\mathbf{16}_3$, $\mathbf{16}_4$ dielectric layers
17 cavity
18 elastic element
19, 19' high-frequency contact element arrangement
20, 20' connecting part, connecting plate, connecting web
21 contact component part
22, 22' bore in connecting plate
23 electrical signal line on connecting plate
24 upper side of connecting plate
25 lower side of connecting plate
26 electrical signal line within connecting plate
27 desired breaking point
28 slot

The invention claimed is:

1. A method, comprising:

forming a dielectric structure, said structure comprising a first terminal surface, a second terminal surface and a through-hole that extends from said first terminal surface to said second terminal surface, applying an electrically conductive material to at least a portion of said dielectric structure, removing a first portion of said electrically conductive material from said first terminal surface, and removing a second portion of said electrically conductive material from said second terminal surface, a remaining portion of said electrically conductive material constituting at least an inner conductor of a first generally coaxial conductor pair and a first shielding conductor of said first generally coaxial conductor pair, an intersection of a first imaginary plane and said inner conductor defining a first closed path, an intersection of said first imaginary plane and said first shielding conductor defining a second closed path that circumscribes said first closed path, and said inner conductor extending through said through-hole.

2. The method of claim 1, wherein:

said applying said electrically conductive material comprises applying said electrically conductive material to substantially an entire surface of said dielectric structure exposed to an ambient environment.

3. The method of claim 1, wherein:

said remaining portion of said electrically conductive material constitutes at least said inner conductor, said first shielding conductor, a first contact, a second contact, a third contact and a fourth contact, said first contact is formed on said first terminal surface and electrically contacts said first shielding conductor, said second contact is formed on said first terminal surface and electrically contacts said inner conductor, said third contact is formed on said second terminal surface and electrically contacts said first shielding conductor, and said fourth contact is formed on said second terminal surface and electrically contacts said inner conductor.

4. The method of claim 3, wherein:

said dielectric structure is structured such that a first impedance of said first generally coaxial conductor pair at said first terminal surface differs significantly from a second impedance of said first generally coaxial conductor pair at said second terminal surface.

5. The method of claim 1, wherein:

said remaining portion of said electrically conductive material constitutes at least said inner conductor, said first shielding conductor, a first contact, a second contact, a third contact, a fourth contact and a second shielding conductor that forms a second generally coaxial conductor pair with said inner conductor, said first contact is formed on said first terminal surface and electrically contacts said first shielding conductor, said second contact is formed on said first terminal surface and electrically contacts said inner conductor, said third contact is formed on said second terminal surface and electrically contacts said second shielding conductor, and said fourth contact is formed on said second terminal surface and electrically contacts said inner conductor.

6. The method of claim 5, wherein:

said dielectric structure is structured such that a first impedance of said first generally coaxial conductor pair at said first terminal surface differs significantly from a second impedance of said second generally coaxial conductor pair at said second terminal surface.

7. The method of claim 1, wherein:

said forming said dielectric structure comprises an additive manufacturing process to form said dielectric structure.

8. The method of claim 1, wherein:

said through-hole is a non-linear through-hole.

9. The method of claim 1, wherein:

said first shielding conductor encircles substantially an entire length of said inner conductor.

10. The method of claim 1, wherein:

said dielectric structure comprises at least one impedance influencing structure selected from the group consisting of a first impedance influencing structure, a second impedance influencing structure and a third impedance influencing structure, said first impedance influencing structure is a void encapsulated within said dielectric structure, said second impedance influencing structure consists of a first volume of first dielectric material of a first relative permeability and a second volume of a second dielectric material of a second relative permeability substantially different from said first relative permeability, and said third impedance influencing structure is a dielectric structure for which a ratio of a diameter of said through-hole to an outer diameter of said dielectric structure at a first cross-section of said dielectric structure differs substantially from a ratio of a diameter of said through-hole to an outer diameter of said dielectric structure at a second cross-section of said dielectric structure.

11. The method of claim 1, wherein:

a first diameter of said through-hole at a first cross-section of said dielectric structure differs substantially from a second diameter of said through-hole at a second cross-section of said dielectric structure, and a first ratio of said first diameter to a first outer diameter of said dielectric structure said first cross-section is substantially equal to a second ratio of said second diameter to a second outer diameter of said dielectric structure at said second cross-section.

12. The method of claim 1, wherein:

a diameter of said through-hole changes continuously over an entire length of said through-hole, and said first ratio is substantially equal to a third ratio of a third diameter of said through-hole at any third cross-section of said dielectric structure to a third outer diameter of said dielectric structure at said third cross-section.

13. The method of claim 1, wherein:

said dielectric structure is an elastic dielectric structure.

14. The method of claim 1, wherein:

said dielectric structure comprises a helically-shaped portion.

15. The method of claim 1, wherein:

said dielectric structure comprises a connecting body, a first plurality of arms, and a second plurality of arms, each of said first plurality of arms projects from said connecting body generally in a first direction, each of said second plurality of arms projects from said connecting body generally in a second direction opposite said first direction, and said through-hole extends through a respective one of said first plurality of arms, through said connecting body and through a respective one of said second plurality of arms.

16. The method of claim 15, wherein:

said first terminal surface is a terminal surface of said respective one of said first plurality of arms distal from said connecting body, and said second terminal surface is a terminal surface of said respective one of said second plurality of arms distal from said connecting body.

17. The method of claim 15, wherein:

said dielectric structure comprises a plurality of through-holes, and each of said plurality of through-holes extends through a respective one of said first plurality of arms, through said connecting body and through a respective one of said second plurality of arms.

18. The method of claim 1, wherein:

said applying comprises:

masking a plurality of surface regions of said dielectric structure from an ambient environment such that each of said plurality of surface regions is not exposed to said ambient environment, and depositing, subsequent to said masking, said electrically conductive material on substantially an entire surface of said dielectric structure exposed to said ambient environment.

19. The method of claim 18, wherein:

said masking comprises:

forming a first mask on a portion of said first terminal surface, and forming a second mask on a portion of said second terminal surface, and said removing said first portion of said electrically conductive material comprises removing said first mask from said first terminal surface, and said removing said second portion of said electrically conductive material comprises removing said second mask from said second terminal surface.

20. A method, comprising:

forming a dielectric structure, said structure comprising a first terminal surface, a second terminal surface and a through-hole that extends from said first terminal surface to said second terminal surface, masking a first plurality of surface regions of said dielectric structure from an ambient environment such that an overall exterior surface of said dielectric structure is subdivided into said first plurality of surface regions not exposed to said ambient environment and a second plurality of surface regions exposed to said ambient environment, depositing, subsequent to said masking, a electrically conductive material on substantially an entire surface of said dielectric structure exposed to said ambient environment, wherein said first plurality of surface regions comprises a first region on said first terminal surface and a second region on said second terminal surface, said second plurality of surface regions collectively shape at least an inner conductor of a first generally coaxial conductor pair and a first shielding conductor of said first generally coaxial conductor pair, an intersection of a first imaginary plane and said inner conductor defining a first closed path, an intersection of said first imaginary plane and said first shielding conductor defining a second closed path that circumscribes said first closed path, said inner conductor is disjoined from said shielding conductor, and said inner conductor extends through said through-hole.

* * * * *